(12) United States Patent
Sun et al.

(10) Patent No.: US 11,594,254 B2
(45) Date of Patent: *Feb. 28, 2023

(54) EVENT/OBJECT-OF-INTEREST CENTRIC TIMELAPSE VIDEO GENERATION ON CAMERA DEVICE WITH THE ASSISTANCE OF NEURAL NETWORK INPUT

(71) Applicant: Ambarella International LP, Santa Clara, CA (US)

(72) Inventors: Luyi Sun, Shanghai (CN); Jian Tang, Shanghai (CN); Ruian Xu, San Jose, CA (US)

(73) Assignee: Ambarella International LP, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/717,060

(22) Filed: Apr. 9, 2022

(65) Prior Publication Data

US 2022/0230663 A1 Jul. 21, 2022

Related U.S. Application Data

(63) Continuation of application No. 17/126,108, filed on Dec. 18, 2020, now Pat. No. 11,373,685.

(30) Foreign Application Priority Data

Aug. 19, 2020 (CN) .......................... 202010836914.7

(51) Int. Cl.
*G11B 27/00* (2006.01)
*H04N 19/40* (2014.01)
(Continued)

(52) U.S. Cl.
CPC .......... *G11B 27/005* (2013.01); *G06K 9/6217* (2013.01); *G06V 20/41* (2022.01);
(Continued)

(58) Field of Classification Search
CPC ....... G11B 27/005; G11B 27/34; G11B 27/28; G06K 9/6217; G06V 20/41; G06V 20/47;
(Continued)

(56) References Cited

U.S. PATENT DOCUMENTS 11,140,292 B1 * 10/2021 Rahmouni ......... H04N 5/23232
2016/0004390 A1 * 1/2016 Laska .............. G08B 13/19682
715/723

(Continued)

*Primary Examiner* — Alazar Tilahun
(74) *Attorney, Agent, or Firm* — Christopher P. Maiorana, PC

(57) ABSTRACT

An apparatus including an interface and a processor. The interface may be configured to receive pixel data generated by a capture device. The processor may be configured to generate video frames in response to the pixel data, perform computer vision operations on the video frames to detect objects, perform a classification of the objects detected based on characteristics of the objects, determine whether the classification of the objects corresponds to a user-defined event and generate encoded video frames from the video frames. The encoded video frames may be communicated to a cloud storage service. The encoded video frames may comprise a first sample of the video frames selected at a first rate when the user-defined event is not detected and a second sample of the video frames selected at a second rate while the user-defined event is detected. The second rate may be greater than the first rate.

20 Claims, 12 Drawing Sheets

(51) Int. Cl.
*H04N 21/239* (2011.01)
*H04N 21/2743* (2011.01)
*H04N 21/414* (2011.01)
*H04N 21/2343* (2011.01)
*G11B 27/34* (2006.01)
*G06K 9/62* (2022.01)
*G06V 20/40* (2022.01)

(52) U.S. Cl.
CPC .............. *G06V 20/47* (2022.01); *G11B 27/34* (2013.01); *H04N 19/40* (2014.11); *H04N 21/2393* (2013.01); *H04N 21/234309* (2013.01); *H04N 21/2743* (2013.01); *H04N 21/41407* (2013.01)

(58) Field of Classification Search
CPC ........ G06V 20/44; G06V 20/52; H04N 19/40; H04N 21/234309; H04N 21/2393; H04N 21/2743; H04N 21/41407; H04N 19/132; H04N 19/136; H04N 19/137; H04N 19/162; H04N 19/177; H04N 19/179; H04N 21/214; H04N 21/4334; H04N 21/231; H04N 21/44008; H04N 21/440218; H04N 21/440281; H04N 21/00; H04N 19/00; H04N 19/182; H04N 19/20; H04N 2101/00; H04N 2201/00; G06F 16/739; G06F 16/75; G06F 16/7837; G06F 16/784; G06N 3/0454; H04L 67/1097; G06T 2213/00; G06T 2215/00

See application file for complete search history.

(56) References Cited

U.S. PATENT DOCUMENTS

2018/0255273 A1* 9/2018 Lee ........................ H04N 9/79
2019/0130188 A1* 5/2019 Zhou ..................... G06V 20/46
2019/0364208 A1* 11/2019 Park ................... H04N 5/23274

* cited by examiner

EVENT/OBJECT-OF-INTEREST CENTRIC TIMELAPSE VIDEO GENERATION ON CAMERA DEVICE WITH THE ASSISTANCE OF NEURAL NETWORK INPUT

This application relates to U.S. patent application Ser. No. 17/126,108, filed on Dec. 18, 2020, which relates to China Patent Application No. 202010836914.7, filed on Aug. 19, 2020. Each of the mentioned applications are hereby incorporated by reference in its entirety.

FIELD OF THE INVENTION

The invention relates to computer vision generally and, more particularly, to a method and/or apparatus for implementing an event/object-of-interest centric timelapse video generation on camera device with the assistance of neural network input.

BACKGROUND

A timelapse video mode for conventional internet-connected/cloud-enabled cameras is usually implemented by software operated on a cloud server. The software relies on using the resources of distributed processing of the cloud server (i.e., scalable computing). Timelapse video clips are displayed at a fixed frame rate for a fast-forward effect. For example, video frames are selected at fixed intervals to create the timelapse video (i.e., every thirtieth frame is selected from a thirty frames per second video to create the timelapse video).

Internet-connected/cloud-enabled cameras encode video data and then communicate the encoded video streams to the cloud servers. In order to transcode the encoded video streams into a timelapse video, the cloud server has to first decode the encoded video stream. The cloud servers spend lots of CPU cycles to decode the conventional video streams (i.e., compressed video using AVC or HEVC encoding), extract the video frames at fixed frame intervals, then transcode these frames into a timelapse video. Meanwhile, even with a timelapse video, users have difficulty finding important details captured by the internet-connected/cloud-enabled cameras. Since a timelapse video always uses a fixed frame rate that does not use all the video data originally captured by the internet-connected/cloud-enabled, video frames at a normal display speed are not available for the entire duration of time that something of interest to the user is in the original video captured. For example, when a security camera observes a potential event of interest, such as a person on the premises, the timelapse will be the same as when the security camera observes nothing of particular interest.

It would be desirable to implement an event/object-of-interest centric timelapse video generation on camera device with the assistance of neural network input.

SUMMARY

The invention concerns an apparatus comprising an interface and a processor. The interface may be configured to receive pixel data generated by a capture device. The processor may be configured to receive the pixel data from the interface, generate video frames in response to the pixel data, perform computer vision operations on the video frames to detect objects, perform a classification of the objects detected based on characteristics of the objects, determine whether the classification of the objects corresponds to a user-defined event and generate encoded video frames from the video frames. The encoded video frames may be communicated to a cloud storage service. The encoded video frames may comprise a first sample of the video frames selected at a first rate when the user-defined event is not detected and a second sample of the video frames selected at a second rate while the user-defined event is detected. The second rate may be greater than the first rate.

BRIEF DESCRIPTION OF THE FIGURES

Embodiments of the invention will be apparent from the following detailed description and the appended claims and drawings.

DETAILED DESCRIPTION OF THE EMBODIMENTS

Figure 1:
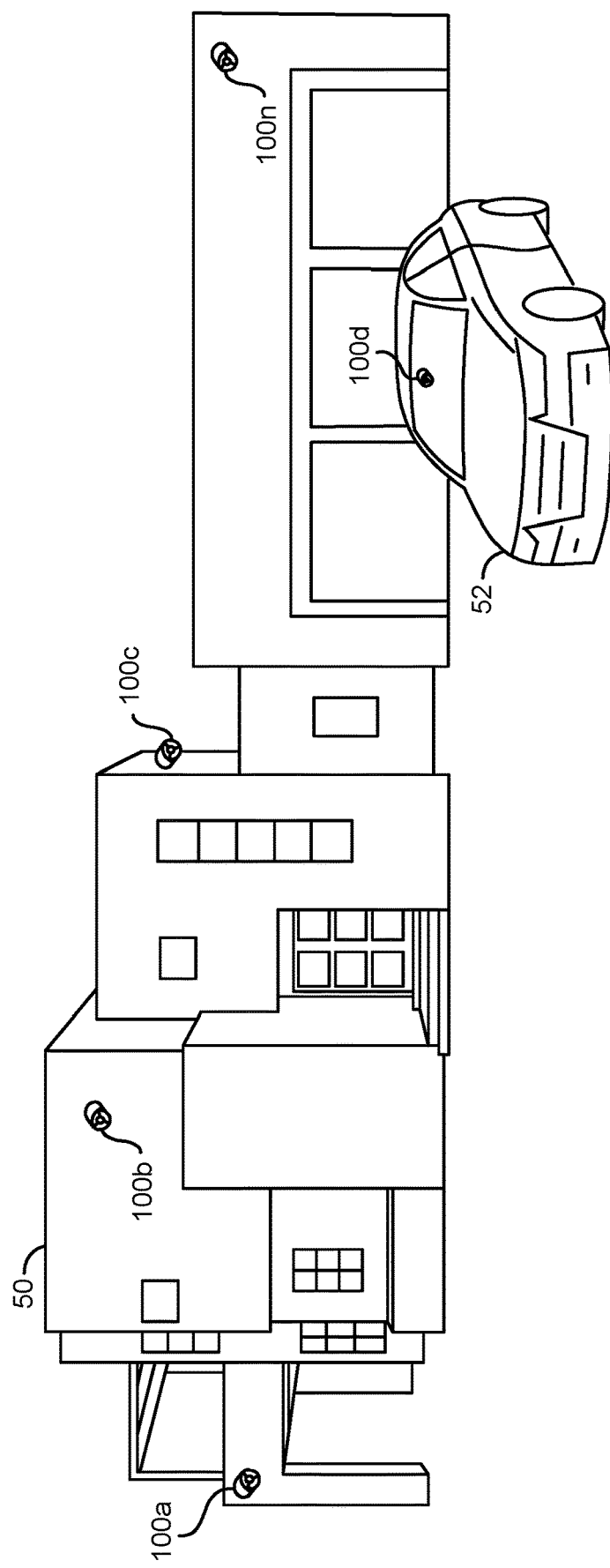
FIG. 1 is a diagram illustrating an example context of the present invention.

Embodiments of the present invention include providing an event/object-of-interest centric timelapse video generation on camera device with the assistance of neural network input that may (i) implement event detection on an edge device, (ii) implement video encoding on an edge device, (iii) generate smart timelapse videos with varying framerates based on events/objects detected, (iv) detect objects/events using a convolutional neural network implemented on a processor, (v) adjust a timelapse framerate to capture all video frames when an event/object is detected, (vi) perform facial recognition and/or object classification local to the camera device, (vii) upload an encoded smart timelapse video to a cloud storage server, (viii) enable configuration of parameters for event/object detection and/or a framerate of a timelapse video using a smartphone app and/or (ix) be implemented as one or more integrated circuits.

Embodiments of the present invention may be configured to generate a smart timelapse video. The smart timelapse video may be implemented by adjusting a video display speed automatically based on content detected in the captured video. The video display speed may be adjusted in response to a selection rate of video frames from the originally captured video to be used for the smart timelapse video. Embodiments of the present invention may be configured to generate encoded smart timelapse videos. The smart timelapse video may be generated on a cloud service (e.g., using scalable computing). The smart timelapse video may be generated on an edge device (e.g., an artificial intelligence (AI) camera). Generating the smart timelapse video on the edge device may comprise only using processing capabilities within the edge device (e.g., without outsourcing processing to an external device). In an example, the edge device may be an internet-connected/cloud-enabled camera.

The edge AI device/camera may be configured to implement artificial intelligence (AI) technology. Using AI technology, the edge AI camera may be a more powerful (e.g., by providing relevant data for the user) and a more power efficient solution than using a cloud server in many aspects. An edge AI camera may be configured to execute computer readable instructions locally (e.g., internally) on the device (e.g., without relying on external processing resources) to analyze the video content frame by frame. Based on the analysis, content in the video frames may be tagged with metadata information. The metadata information may be used to select video frames for a smart timelapse video. For example, the video frames may be classified by being tagged as having no interesting object/event and as having an interesting object/event. Computer vision (CV) operations may determine whether there is an interesting object/event (e.g., based on a pre-defined feature set).

When there is no interesting CV event (or type of object) in the video frames for a duration of N seconds (N=60/120/190/ . . . ), the edge AI camera may select one of the video frames captured during the no-event duration. The selected no-event video frame may be used for video encoding (e.g., a video encoder built in the edge AI camera device that performs video encoding internally). Selecting one video frame from the no-event duration N for encoding may be repeated for each N second duration with no event detected. Selecting one video frame from the no-event duration N for encoding may result in an encoded output that provides a condensed portion of the captured video (e.g., to effectively fast-forward through "meaningless content" portions of video captured with a high display speed).

When there is an interesting CV event (or type of object) detected in the video frames for a duration of M seconds (M=5/15/30/ . . . ), the edge AI camera may adjust how many and/or the rate of selection of the CV event video frames for the event duration M. The event detected may be defined based on a pre-determined feature set. In an example, the object and/or event of interest may be considered to be detected when a person is detected, a car is detected, an animal detected, an amount of motion is detected, a particular face detected, etc. The selection of the video frames for the smart timelapse video may be adjusted to select all of the video frames from the M second duration of the CV event (e.g., for a 2 minute event captured at 60 frames per second, the entire 7200 frames may be selected). The selection of the CV event video frames may be adjusted to select video frames at a higher rate than for the no-event duration (e.g., select more frames, but not all frames) for the M second duration of the event (e.g., for a 2 minute event captured at 60 frames per second, the rate of selection may be changed to 30 frames and every other frame may be selecting resulting in 3600 video frames being selected).

The selected CV event video frames may be encoded (e.g., using the on-device video encoding of the AI edge camera to perform encoding locally). Selecting video frames at a higher rate for the event duration M for encoding may result in an encoded output that provides either a portion of the smart timelapse video with the normal display speed for the "meaningful content" or a portion of the smart timelapse video with a slightly condensed (but not as high speed as the "meaningless content") display speed for the "meaningful content".

With the smart timelapse video generation implemented on an edge camera, the user may quickly browse through the captured video content for a long period of time (e.g., days/weeks/months), and the user may be confident that no interesting CV event will be missed. An interesting CV event may comprise detecting a person (e.g., a known person) by face detection and/or face recognition, detecting a car license plate (e.g., using a license plate reader), detecting a pet (e.g., a known animal) using animal/pet recognition, detecting motion (e.g., any motion detected above a pre-defined threshold), etc. The type of event and/or object detected that may be considered an interesting event may be varied according to the design criteria of a particular implementation.

Embodiments of the present invention may enable a user to specify the type of object/event that may be considered to be interesting. In one example, an app operating on a smartphone (e.g., a companion app for the edge AI camera) may be configured to adjust settings for the edge AI camera. In another example, the edge AI camera may be configured to provide a web interface (e.g., over a local area network) to enable a user to remotely select objects/events to be considered interesting events. In yet another example, the edge AI camera may connect to a cloud server, and the user may use a web interface to adjust settings stored on the cloud server that may then be sent to the edge AI camera to control the smart timelapse object type(s) of interest.

The duration of the smart timelapse video may be configured as regular intervals and/or since the last time the user has received a timelapse video. For example, if the user has missed 20 event notifications, the moment the users interacts with the app (e.g., swipes on a smartphone) to view the events, the event-focused timelapse may be presented to the user for viewing. While embodiments of the present invention may generally be performed local to an edge AI camera (e.g., implementing a processor configured to implement a convolutional neural network and/or video encoding locally), embodiments of the present invention may be performed using software on the cloud server to achieve similar effects.

Referring to FIG. 1, a diagram illustrating an example context of the present invention is shown. A home 50 and a vehicle 52 are shown. Camera systems 100a-100n are shown. Each of the cameras 100a-100n may be configured to generate pixel data of the environment, generate video frames from the pixel data, encode the video frames and/or generate the smart timelapse videos. For example, each of the cameras 100a-100n may be configured to operate independently of each other. Each of the cameras 100a-100n may capture video and generate smart timelapse videos. In one example, the respective smart timelapse videos may be uploaded to a cloud storage service. In another example, the respective smart timelapse videos may be stored locally (e.g., on a microSD card, to a local network attached storage device, etc.).

Each of the cameras 100a-100n may be configured to detect different or the same events/objects that may be considered interesting. For example, the camera system 100b may capture an area near an entrance of the home 50. For an entrance of the home 50, objects/events of interest may be detecting people. The camera system 100b may be configured to analyze video frames to detect people and the smart timelapse video may slow down (e.g., select video frames for encoding at a higher frame rate) when a person is detected. In another example, the camera system 100d may capture an area near the vehicle 52. For the vehicle 52, objects/events of interest may be detecting other vehicles and pedestrians. The camera system 100b may be configured to analyze video frames to detect vehicles (or road signs) and people and the smart timelapse video may slow down when a vehicle or a pedestrian is detected.

Each of the cameras 100a-100n may operate independently from each other. For example, each of the cameras 100a-100n may individually analyze the pixel data captured and perform the event/object detection locally. In some embodiments, the cameras 100a-100n may be configured as a network of cameras (e.g., security cameras that send video data to a central source such as network-attached storage and/or a cloud service). The locations and/or configurations of the cameras 100a-100n may be varied according to the design criteria of a particular implementation.

Figure 2:
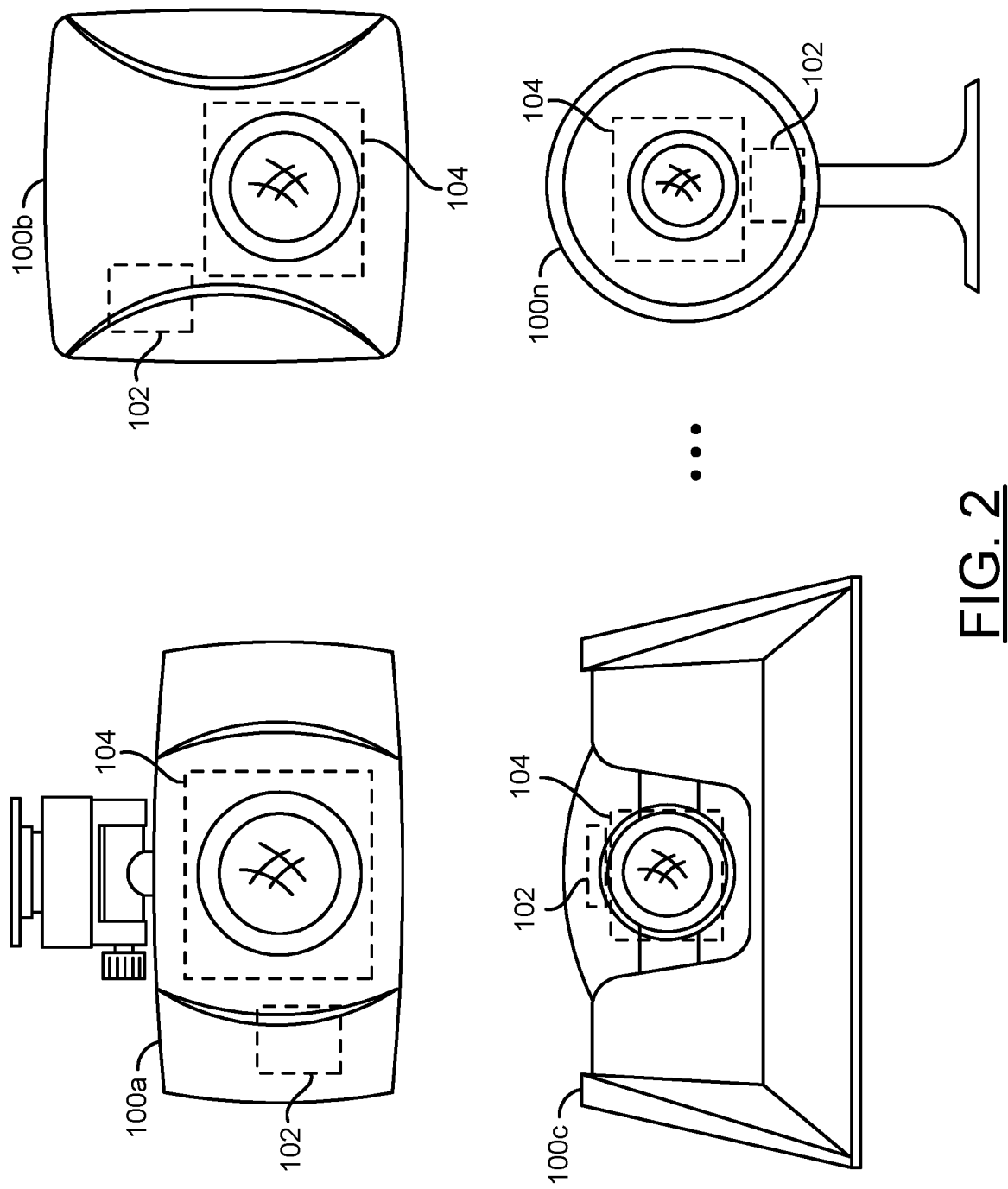
FIG. 2 is a diagram illustrating example internet-connected cameras implementing an example embodiment of the present invention.

Referring to FIG. 2, a diagram illustrating example internet-connected cameras implementing an example embodiment of the present invention is shown. Camera systems 100a-100n are shown. Each camera device 100a-100n may have a different style and/or use case. For example, the camera 100a may be an action camera, the camera 100b may be a ceiling mounted security camera, the camera 100n may be webcam, etc. Other types of cameras may be implemented (e.g., home security cameras, battery powered cameras, doorbell cameras, stereo cameras, etc.). The design/style of the cameras 100a-100n may be varied according to the design criteria of a particular implementation.

Each of the camera systems 100a-100n may comprise a block (or circuit) 102 and/or a block (or circuit) 104. The circuit 102 may implement a processor. The circuit 104 may implement a capture device. The camera systems 100a-100n may comprise other components (not shown). Details of the components of the cameras 100a-100n may be described in association with FIG. 3.

The processor 102 may be configured to implement a convolutional neural network (CNN). The processor 102 may be configured to implement a video encoder. The processor 102 may generate the smart timelapse videos. The capture device 104 may be configured to capture pixel data that may be used by the processor 102 to generate video frames.

The cameras 100a-100n may be edge devices. The processor 102 implemented by each of the cameras 100a-100n may enable the cameras 100a-100n to implement various functionality internally (e.g., at a local level). For example, the processor 102 may be configured to perform object/event detection (e.g., computer vision operations), video encoding and/or video transcoding on-device. For example, even advanced processes such as computer vision may be performed by the processor 102 without uploading video data to a cloud service in order to offload computation-heavy functions (e.g., computer vision, video encoding, video transcoding, etc.).

Figure 3:
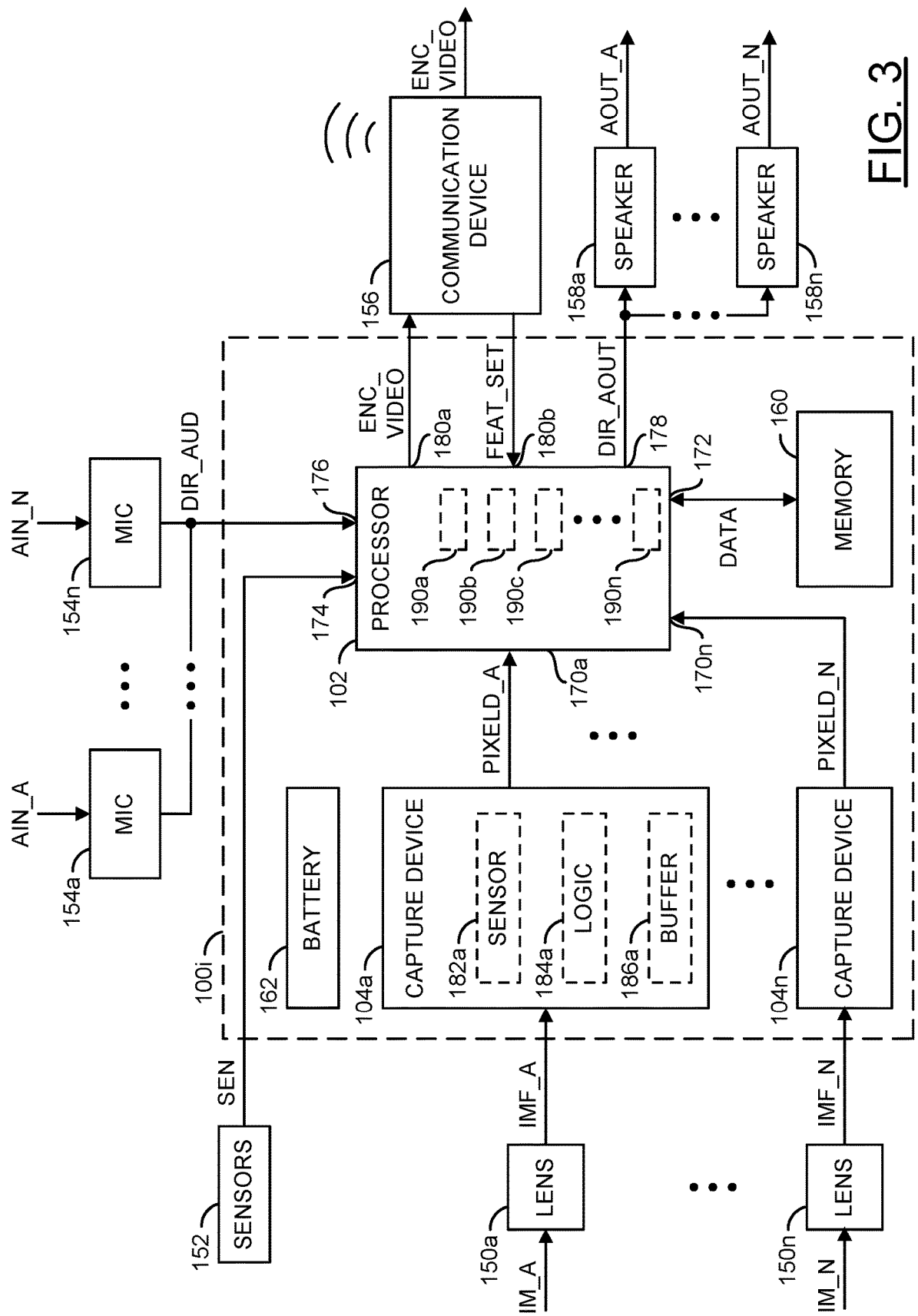
FIG. 3 is a block diagram illustrating components of an apparatus configured to provide an event centric timelapse video with the assistance of a neural network.

Referring to FIG. 3, a block diagram illustrating components of an apparatus configured to provide an event centric timelapse video with the assistance of a neural network is shown. A block diagram of the camera system 100i is shown. The camera system 100i may be a representative example of the camera system 100a-100n shown in association with FIGS. 1-2. The camera system 100i generally comprises the processor 102, the capture devices 104a-104n, blocks (or circuits) 150a-150n, a block (or circuit) 152, blocks (or circuits) 154a-154n, a block (or circuit) 156, blocks (or circuits) 158a-158n, a block (or circuit) 160 and/or a block (or circuit) 162. The blocks 150a-150n may implement lenses. The circuit 152 may implement sensors. The circuits 154a-154n may implement microphones (e.g., audio capture devices). The circuit 156 may implement a communication device. The circuits 158a-158n may implement audio output devices (e.g., speakers). The circuit 160 may implement a memory. The circuit 162 may implement a power supply (e.g., a battery). The camera system 100i may comprise other components (not shown). In the example shown, some of the components 150-158 are shown external to the camera system 100i. However, the components 150-158 may be implemented within and/or attached to the camera system 100i (e.g., the speakers 158a-158n may provide better functionality if not located inside a housing of the camera system 100i). The number, type and/or arrangement of the components of the camera system 100i may be varied according to the design criteria of a particular implementation.

In an example implementation, the processor 102 may be implemented as a video processor. The processor 102 may comprise inputs 170a-170n and/or other inputs. The processor 102 may comprise an input/output 172. The processor 102 may comprise an input 174 and an input 176. The processor 102 may comprise an output 178. The processor 102 may comprise an output 180a and an input 180b. The number of inputs, outputs and/or bi-directional ports implemented by the processor 102 may be varied according to the design criteria of a particular implementation.

In the embodiment shown, the capture devices 104a-104n may be components of the camera system 100i. In some embodiments, the capture devices 104a-104n may be separate devices (e.g., remotely connected to the camera system 100i, such as a drone, a robot and/or a system of security cameras configured capture video data) configured to send data to the camera system 100i. In one example, the capture devices 104a-104n may be implemented as part of an autonomous robot configured to patrol particular paths such as hallways. Similarly, in the example shown, the sensors 152, the microphones 154a-154n, the wireless communication device 156, and/or the speakers 158a-158n are shown external to the camera system 100i but in some embodiments may be a component of (e.g., within) the camera system 100i.

The camera system 100i may receive one or more signals (e.g., IMF_A-IMF_N), a signal (e.g., SEN), a signal (e.g., FEAT_SET) and/or one or more signals (e.g., DIR_AUD). The camera system 100i may present a signal (e.g., ENC_VIDEO) and/or a signal (e.g., DIR_AOUT). The capture devices 104a-104n may receive the signals IMF_A-IMF_N from the corresponding lenses 150a-150n. The processor 102 may receive the signal SEN from the sensors 152. The processor 102 may receive the signal DIR_AUD from the microphones 154a-154n. The processor 102 may present the signal ENC_VIDEO to the communication device 156 and receive the signal FEAT_SET from the communication device 156. For example, the wireless communication device 156 may be a radio-frequency (RF) transmitter. In another example, the communication device 156 may be a Wi-Fi module. In another example, the communication device 156 may be a device capable of implementing RF transmission, Wi-Fi, Bluetooth and/or other wireless communication protocols. In some embodiments, the signal ENC_VIDEO may be presented to a display device connected to the camera 100i. The processor 102 may present the signal DIR_AOUT to the speakers 158a-158n.

The lenses 150a-150n may capture signals (e.g., IM_A-IM_N). The signals IM_A-IM_N may be an image (e.g., an analog image) of the environment near the camera system 100i presented by the lenses 150a-150n to the capture devices 104a-104n as the signals IMF_A-IMF_N. The lenses 150a-150n may be implemented as an optical lens. The lenses 150a-150n may provide a zooming feature and/or a focusing feature. The capture devices 104a-104n and/or the lenses 150a-150n may be implemented, in one example, as a single lens assembly. In another example, the lenses 150a-150n may be a separate implementation from the capture devices 104a-104n. The capture devices 104a-104n are shown within the circuit 100i. In an example implementation, the capture devices 104a-104n may be implemented outside of the circuit 100i (e.g., along with the lenses 150a-150n as part of a lens/capture device assembly).

In some embodiments, two or more of the lenses 150a-150n may be configured as a stereo pair of lenses. For example, the camera 100i may implement stereo vision. The lenses 150a-150n implemented as a stereo pair may be implemented at a pre-determined distance apart from each other and at a pre-determined inward angle. The pre-determined distance and/or the pre-determined inward angle may be used by the processor 102 to build disparity maps for stereo vision.

The capture devices 104a-104n may be configured to capture image data for video (e.g., the signals IMF_A-IMF_N from the lenses 150a-150n). In some embodiments, the capture devices 104a-104n may be video capturing devices such as cameras. The capture devices 104a-104n may capture data received through the lenses 150a-150n to generate raw pixel data. In some embodiments, the capture devices 104a-104n may capture data received through the lenses 150a-150n to generate bitstreams (e.g., generate video frames). For example, the capture devices 104a-104n may receive focused light from the lenses 150a-150n. The lenses 150a-150n may be directed, tilted, panned, zoomed and/or rotated to provide a targeted view from the camera system 100i (e.g., a view for a video frame, a view for a panoramic video frame captured using multiple capture devices 104a-104n, a target image and reference image view for stereo vision, etc.). The capture devices 104a-104n may generate signals (e.g., PIXELD_A-PIXELD_N). The signals PIXELD_A-PIXELD_N may be pixel data (e.g., a sequence of pixels that may be used to generate video frames). In some embodiments, the signals PIXELD_A-PIXELD_N may be video data (e.g., a sequence of video frames). The signals PIXELD_A-PIXELD_N may be presented to the inputs 170a-170n of the processor 102.

The capture devices 104a-104n may transform the received focused light signals IMF_A-IMF_N into digital data (e.g., bitstreams). In some embodiments, the capture devices 104a-104n may perform an analog to digital conversion. For example, the capture devices 104a-104n may perform a photoelectric conversion of the focused light received by the lenses 150a-150n. The capture devices 104a-104n may transform the bitstreams into pixel data, images and/or video frames. In some embodiments, the pixel data generated by the capture devices 104a-104n may be uncompressed and/or raw data generated in response to the focused light from the lenses 150a-150n. In some embodiments, the output of the capture devices 104a-104n may be digital video signals.

The sensors 152 may comprise one or more input devices. The sensors 152 may be configured to detect physical input from the environment and convert the physical input into computer readable signals. The signal SEN may comprise the computer readable signals generated by the sensors 152. In an example, one of the sensors 152 may be configured to detect an amount of light and present a computer readable signal representing the amount of light detected. In another example, one of the sensors 152 may be configured to detect motion and present a computer readable signal representing the amount of motion detected. The sensors 152 may be configured to detect temperature (e.g., a thermometer), orientation (e.g., a gyroscope), a movement speed (e.g., an accelerometer), etc. The types of input detected by the sensors 152 may be varied according to the design criteria of a particular implementation.

The data provided in the signal SEN provided by the sensors 152 may be read and/or interpreted by the processor 102. The processor 102 may use the data provided by the signal SEN for various operations. In some embodiments, the processor 102 may use a light reading from the sensors 152 to determine whether to activate an infrared light (e.g., to provide night vision). In another example, the processor 102 may use information about movement from an accelerometer and/or a gyroscope to perform motion correction on video frames generated. The types of operations performed by the processor 102 in response to the signal SEN may be varied according to the design criteria of a particular implementation.

The communication device 156 may send and/or receive data to/from the camera system 100i. In some embodiments, the communication device 156 may be implemented as a wireless communications module. In some embodiments, the communication device 156 may be implemented as a satellite connection to a proprietary system. In one example, the communication device 156 may be a hard-wired data port (e.g., a USB port, a mini-USB port, a USB-C connector, HDMI port, an Ethernet port, a DisplayPort interface, a Lightning port, etc.). In another example, the communication device 156 may be a wireless data interface (e.g., Wi-Fi, Bluetooth, ZigBee, cellular, etc.).

The communication device 156 may be configured to receive the signal FEAT_SET. The signal FEAT_SET may comprise a feature set. The feature set received may be used to detect events and/or objects. For example, the feature set may be used to perform the computer vision operations. The feature set information may comprise instructions for the processor 102 for determining which types of objects correspond to an object and/or event of interest.

The processor 102 may receive the signals PIXELD_A-PIXELD_N from the capture devices 104a-104n at the inputs 170a-170n. The processor 102 may send/receive a signal (e.g., DATA) to/from the memory 160 at the input/output 172. The processor 102 may receive the signal SEN from the sensors 152 at the input port 174. The processor 102 may receive the signal DIR_AUD from the microphones 154a-154n at the port 176. The processor 102 may send the signal DIR_AOUT to the speakers 158a-158n via the port 178. The processor 102 may send the signal ENC_VIDEO to the communication device 156 via the output port 180a. The processor 102 may receive the signal FEAT_SET from the communication device 156 via the input port 180b. In an example, the processor 102 may be connected through a bi-directional interface (or connection) to the capture devices 104a-104n, the sensors 152, the microphones 154a-154n, the communication device 156, and/or the speakers 158a-158n and/or the memory 160. The processor 102 may store and/or retrieve data from the memory 160. The memory 160 may be configured to store computer readable/executable instructions (or firmware). The instructions, when executed by the processor 102, may perform a number of steps.

The signal PIXELD_A-PIXELD_N may comprise raw pixel data providing a field of view captured by the lenses 150a-150n. The processor 102 may be configured to generate video frames from the pixel data PIXELD_A-PIXELD_N. The video frames generated by the processor 102 may be used internal to the processor 102 (e.g., to perform video encoding, video transcoding, perform computer vision operations, etc.). In some embodiments, the video frames may be communicated to the memory 160 for temporary storage. The processor 102 may be configured to generate encoded video frames and communicate the encoded video frames to the communication device 156 as the signal ENC_VIDEO.

The processor 102 may be configured to make decisions based on analysis of the video frames generated from the signals PIXELD_A-PIXELD_N. The processor 102 may generate the signal ENC_VIDEO, the signal DATA, the signal DIR_AOUT and/or other signals (not shown). The signal ENC_VIDEO, the signal DATA and/or the signal DIR_AOUT may each be generated (in part) based on one or more decisions made and/or functions performed by the processor 102. The decisions made and/or functions performed by the processor 102 may be determined based on data received by the processor 102 at the inputs 170a-170n (e.g., the signals PIXELD_A-PIXELD_N), the input 172, the input 174, the input 176, the input 180b and/or other inputs.

The inputs 170a-170n, the input/output 172, the input 174, the input 176, the output 178, the output 180a, the input 180b, and/or other inputs/outputs may implement an interface. The interface may be implemented to transfer data to/from the processor 102, the sensors 152, the communication device 156, the capture devices 104a-104n, the memory 160, the microphones 154a-154n, the speakers 158a-158n and/or other components of the camera system 100i. In one example, the interface may be configured to receive (e.g., via the inputs 170a-170n) the pixel data signals PIXELD_A-PIXELD_N each from a respective one of the capture devices 104a-104n. In another example, the interface may be configured to receive (e.g., via the input 174) sensor input from the sensors 152. In yet another example, the interface may be configured to receive (e.g., via the input 176) the directional audio DIR_AUD. In still another example, the interface may be configured to transmit encoded video frames (e.g., the signal ENC_VIDEO) and/or the converted data determined based on the computer vision operations to the communication device 156. In another example, the interface may be configured to receive the feature set information FEAT_SET (e.g., via the input port 180b) from the communication device 156. In yet another example, the interface may be configured to transmit directional audio output (e.g., the signal DIR_AOUT) to each of the speakers 158a-158n. The interface may be configured to enable transfer of data and/or translate data from one format to another format to ensure that the data transferred is readable by the intended destination component. In an example, the interface may comprise a data bus, traces, connectors, wires and/or pins. The implementation of the interface may be varied according to the design criteria of a particular implementation.

The signal ENC_VIDEO may be presented to the communication device 156. In some embodiments, the signal ENC_VIDEO may comprise encoded video frames generated by the processor 102. In some embodiments, the encoded video frames may comprise a full video stream (e.g., encoded video frames representing all video captured by the capture devices 104a-104n). In some embodiments, the encoded video frames may comprise a smart timelapse video. The encoded video frames may be encoded, cropped, stitched and/or enhanced versions of the pixel data received from the signals PIXELD_A-PIXELD_N. In an example, the encoded video frames may be a high resolution, digital, encoded, de-warped, stabilized, cropped, blended, stitched and/or rolling shutter effect corrected version of the signals PIXELD_A-PIXELD_N.

In some embodiments, the signal ENC_VIDEO may be generated based on video analytics (e.g., computer vision operations) performed by the processor 102 on the video frames generated from the pixel data PIXELD_A-PIXELD_N. The processor 102 may be configured to perform the computer vision operations to detect objects and/or events in the video frames and then convert the detected objects and/or events into statistics and/or parameters. In one example, the data determined by the computer vision operations may be converted to the human-readable format by the processor 102. The data from the computer vision operations may be used to detect objects and/or events to determine video frames to select for the smart timelapse video. The computer vision operations may be performed by the processor 102 locally (e.g., without communicating to an external device to offload computing operations).

In some embodiments, the signal ENC_VIDEO may be data generated by the processor 102 (e.g., video analysis results, audio/speech analysis results, etc.) that may be communicated to a cloud computing service in order to aggregate information and/or provide training data for machine learning (e.g., to improve object detection, to improve audio detection, etc.). In some embodiments, the signal ENC_VIDEO may be provided to a cloud service for mass storage (e.g., to enable a user to retrieve the encoded video using a smartphone and/or a desktop computer). The type of information communicated by the signal ENC_VIDEO may be varied according to the design criteria of a particular implementation.

The circuit 100i may implement a camera system. In some embodiments, the camera system 100i may be implemented as a drop-in solution (e.g., installed as one component). In an example, the camera system 100i may be a device that may be installed as an after-market product (e.g., a retro-fit for a drone, a retro-fit for a security system, etc.). In some embodiments, the camera system 100i may be a component of a security system. The number and/or types of signals and/or components implemented by the camera system 100i may be varied according to the design criteria of a particular implementation.

The video data of the targeted view captured by the capture devices 104a-104n may be generated from the signals/bitstreams/data PIXELD_A-PIXELD_N. The capture devices 104a-104n may present the signals PIXELD_A-PIXELD_N to the inputs 170a-170n of the processor 102. The signals PIXELD_A-PIXELD_N may be used by the processor 102 to generate the video frames/video data. In some embodiments, the signals PIXELD_A-PIXELD_N may be video streams captured by the capture devices 104a-104n. In some embodiments, the capture devices 104a-104n may be implemented in the camera system 100i. In some embodiments, the capture devices 104a-104n may be configured to add to existing functionality to the camera system 100i.

Each of the capture devices 104a-104n may comprise a block (or circuit) 182, a block (or circuit) 184, and/or a block (or circuit) 186. The circuit 182 may implement a camera sensor (e.g., a complementary metal-oxide-semiconductor (CMOS) sensor). The circuit 184 may implement a camera processor/logic. The circuit 186 may implement a memory buffer. As a representative example, the capture device 104a is shown comprising the sensor 182a, the logic block 184a and the buffer 186a. Similarly, the capture devices 104b-104n may comprise the camera sensors 182b-182n, the logic blocks 184b-184n and the buffers 186b-186n. The sensors 182a-182n may each be configured to receive light from the corresponding one of the lenses 150a-150n and transform the light into digital data (e.g., the bitstreams).

In one example, the sensor 182a of the capture device 104a may receive light from the lens 150a. The camera sensor 182a of the capture device 104a may perform a photoelectric conversion of the light from the lens 150a. In some embodiments, the sensor 182a may be an oversampled binary image sensor. In some embodiments, the camera sensor 182a may comprise an RGB sensor or an RGB-IR sensor. In some embodiments, the camera sensor 182a may comprise a rolling shutter sensor or a global shutter sensor. The logic 184a may transform the bitstream into a human-legible content (e.g., pixel data and/or video data). For example, the logic 184a may receive pure (e.g., raw) data from the camera sensor 182a and generate pixel data based on the raw data (e.g., the bitstream). The memory buffer 186a may store the raw data and/or the processed bitstream. For example, the frame memory and/or buffer 186a may store (e.g., provide temporary storage and/or cache) the pixel data and/or one or more of the video frames (e.g., the video signal).

The microphones 154a-154n may be configured to capture incoming audio and/or provide directional information about the incoming audio. Each of the microphones 154a-154n may receive a respective signal (e.g., AIN_A-AIN_N). The signals AIN_A-AIN_N may be audio signals from the environment near the camera system 100i. For example, the signals AIN_A-AIN_N may be ambient noise in the environment. The microphones 154a-154n may be configured to generate the signal DIR_AUD in response to the signals AIN_A-AIN_N. The signal DIR_AUD may be a signal that comprises the audio data from the signals AIN_A-AIN_N. The signal DIR_AUD may be a signal generated in a format that provides directional information about the signals AIN_A-AIN_N.

The microphones 154a-154n may provide the signal DIR_AUD to the interface 176. The camera system 100i may comprise the interface 176 configured to receive data (e.g., the signal DIR_AUD) from one or more of the microphones 154a-154n. In one example, data from the signal DIR_AUD presented to the interface 176 may be used by the processor 102 to determine the location of the source of the audio input. In another example, the microphones 154a-154n may be configured to determine the location of the audio input and present the location to the interface 176 as the signal DIR_AUD.

The number of microphones 154a-154n may be varied according to the design criteria of a particular implementation. The number of microphones 154a-154n may be selected to provide sufficient directional information about the incoming audio (e.g., the number of microphones 154a-154n implemented may be varied based on the accuracy and/or resolution of directional information acquired). In an example, 2 to 6 of the microphones 154a-154n may be implemented. In some embodiments, an audio processing component may be implemented with the microphones 154a-154n to process and/or encode the incoming audio signals AIN_A-AIN_N. In some embodiments, the processor 102 may be configured with on-chip audio processing to encode the incoming audio signals AIN_A-AIN_N. The microphones 154a-154n may capture audio of the environment 50. The camera system 100i may be configured to synchronize the audio captured with the images captured by the capture devices 104a-104n.

The processor 102 may be configured to execute computer readable code and/or process information. The processor 102 may be configured to receive input and/or present output to the memory 160. The processor 102 may be configured to present and/or receive other signals (not shown). The number and/or types of inputs and/or outputs of the processor 102 may be varied according to the design criteria of a particular implementation.

The processor 102 may receive the signals PIXELD_A-PIXELD_N, the signal SEN, the signal DIR_AUD, the signal FEAT_SET and/or the signal DATA. The processor 102 may make a decision based on data received at the inputs 170a-170n, the input 172, the input 174, the input 176, the input 180b and/or other input. For example, other inputs may comprise external signals generated in response to user input, external signals generated by the sensors 152, the microphones 154a-154n and/or internally generated signals such as signals generated by the processor 102 in response to analysis of the video frames and/or objects detected in the video frames. The processor 102 may adjust the video data (e.g., crop, digitally move, physically move the camera sensors 182a-182n, etc.) of the video frames. The processor 102 may generate the signal ENC_VIDEO and/or the signal DIR_AOUT in response to data received by the inputs 170a-170n, the input 172, the input 174, the input 176, the input 180b and/or the decisions made in response to the data received by the inputs 170a-170n, the input 172, the input 174, the input 176 and/or the input 180b. The various operations performed by the processor 102 may be performed locally (e.g., using the internal components of the camera 100i rather than offloading computing operations to external resources such as a cloud service).

The signal ENC_VIDEO and/or the signal DIR_AOUT may be generated to provide an output in response to the captured video frames, the video encoding and/or the video analytics performed by the processor 102. For example, the video analytics may be performed by the processor 102 in real-time and/or near real-time (e.g., with minimal delay).

The cropping, downscaling, blending, stabilization, packetization, encoding, compression and/or conversion performed by the processor 102 may be varied according to the design criteria of a particular implementation. For example, the video frames generated by the processor 102 may be a processed version of the signals PIXELD_A-PIXELD_N configured to enable detection of the objects and/or determination of the characteristics of the detected objects. In some embodiments, the video data may be encoded at a high bitrate. For example, the signal may be generated using a lossless compression and/or with a low amount of lossiness.

In some embodiments, the video frames may be some view (or derivative of some view) captured by the capture devices 104a-104n. For example, the video frames may comprise a portion of the panoramic video captured by the capture devices 104a-104n. In another example, the video frames may comprise a region of interest selected and/or cropped from the panoramic video frame by the processor 102 (e.g., upscaled, oversampled and/or digitally zoomed) to enable a high precision of object detection. In some embodiments, the video frames may provide a series of cropped and/or enhanced video frames that improve upon the view from the perspective of the camera system 100i (e.g., provides night vision, provides High Dynamic Range (HDR) imaging, provides more viewing area, highlights detected objects, provides additional data such as a numerical distance to detected objects, etc.) to enable the processor 102 to see the location better than a person would be capable of with human vision.

The memory 160 may store data. The memory 160 may be implemented as a cache, flash memory, DRAM memory, etc. The type and/or size of the memory 160 may be varied according to the design criteria of a particular implementation. The data stored in the memory 160 may correspond to a video file, user profiles, user permissions, a feature set, types of objects/events of interest, information about the configuration of the lenses 150a-150n, etc.

The battery 162 may be configured to provide power to the components of the camera 100i. The battery 162 may enable the camera 100i to operate without continual access to an external power supply. In an example, the battery 162 may comprise a lithium-ion type of battery. In another example, the battery 162 may comprise a supercapacitor. The type of battery 162 implemented may be varied according to the design criteria of a particular implementation.

The lenses 150a-150n (e.g., camera lenses) may be directed to provide a panoramic view from the camera system 100i. The lenses 150a-150n may be aimed to capture environmental data (e.g., light). The lens 150a-150n may be configured to capture and/or focus the light for the capture devices 104a-104n. Generally, the camera sensors 182a-182n may be located behind each of the respective lenses 150a-150n. Based on the captured light from the lenses 150a-150n, the capture devices 104a-104n may generate a bitstream and/or raw pixel data.

Embodiments of the processor 102 may perform video stitching operations on the signals PIXELD_A-PIXELD_N. In one example, each of the pixel data signals PIXELD_A-PIXELD_N may provide a portion of a panoramic view and the processor 102 may crop, blend, synchronize and/or align the pixel data from the signals PIXELD_A-PIXELD_N to generate the panoramic video frames. In some embodiments, the processor 102 may be configured to perform electronic image stabilization (EIS). The processor 102 may perform de-warping on the video frames. The processor 102 may perform intelligent video analytics on the de-warped video frames. The processor 102 discard the video frames after the video analytics and/or computer vision has been performed.

The encoded video frames may be processed locally. In one example, the encoded, panoramic video may be stored locally by the memory 160 to enable the processor 102 to facilitate the computer vision analysis internally (e.g., without first uploading video frames to a cloud service). The processor 102 may be configured to select the video frames to be encoded for the smart timelapse video.

The processor 102 may receive an input to generate the video frames (e.g., the signals PIXELD_A-PIXELD_N) from the CMOS sensor(s) 182a-182n. The pixel data signals PIXELD_A-PIXELD_N may be enhanced by the processor 102 (e.g., color conversion, noise filtering, auto exposure, auto white balance, auto focus, etc.). Generally, the panoramic video may comprise a large field of view generated by one or more lenses/camera sensors. One example of a panoramic video may be an equirectangular 360 video. Equirectangular 360 video may also be called spherical panoramas. Panoramic video may be a video that provides a field of view that is larger than the field of view that may be displayed on a device used to playback the video. For example, the field of view captured by the camera system 100i may be used to generate panoramic video such as a spherical video, a hemispherical video, a 360 degree video, a wide angle video, a video having less than a 360 field of view, etc.

Panoramic videos may comprise a view of the environment near the camera system 100i. In one example, the entire field of view of the panoramic video may be captured at generally the same time (e.g., each portion of the panoramic video represents the view from the camera system 100i at one particular moment in time). In some embodiments (e.g., when the camera system 100i implements a rolling shutter sensor), a small amount of time difference may be present between some portions of the panoramic video. Generally, each video frame of the panoramic video comprises one exposure of the sensor (or the multiple sensors 182a-182n) capturing the environment near the camera system 100i.

In some embodiments, the field of view may provide coverage for a full 360 degree field of view. In some embodiments, less than a 360 degree view may be captured by the camera system 100i (e.g., a 270 degree field of view, a 180 degree field of view, etc.). In some embodiments, the panoramic video may comprise a spherical field of view (e.g., capture video above and below the camera system 100i). For example, the camera system 100i may be mounted on a ceiling and capture a spherical field of view of the area below the camera system 100i. In some embodiments, the panoramic video may comprise a field of view that is less than a spherical field of view (e.g., the camera system 100i may be configured to capture the ground below and the areas to the sides of the camera system 100i but nothing directly above). The implementation of the camera system 100i and/or the captured field of view may be varied according to the design criteria of a particular implementation.

In embodiments implementing multiple lenses, each of the lenses 150a-150n may be directed towards one particular direction to provide coverage for a full 360 degree field of view. In embodiments implementing a single wide angle lens (e.g., the lens 150a), the lens 150a may be located to provide coverage for the full 360 degree field of view (e.g., on the bottom of the camera system 100i in a ceiling mounted embodiment, on the bottom of a drone camera, etc.). In some embodiments, less than a 360 degree view may be captured by the lenses 150a-150n (e.g., a 270 degree field of view, a 180 degree field of view, etc.). In some embodiments, the lenses 150a-150n may move (e.g., the direction of the capture devices may be controllable). In some embodiments, one or more of the lenses 150a-150n may be configured to implement an optical zoom (e.g., the lenses 150a-150n may zoom in/out independent of each other).

In some embodiments, the camera system 100i may be implemented as a system on chip (SoC). For example, the camera system 100i may be implemented as a printed circuit board comprising one or more components (e.g., the capture devices 104a-104n, the processor 102, the communication device 156, the memory 160, etc.). The camera system 100i may be configured to perform intelligent video analysis on the video frames of the video. The camera system 100*i* may be configured to crop and/or enhance the video.

In some embodiments, the processor 102 may be configured to perform sensor fusion operations. The sensor fusion operations performed by the processor 102 may be configured to analyze information from multiple sources (e.g., the capture devices 104*a*-104*n*, the sensor 152 and the microphones 154*a*-154*n*). By analyzing various data from disparate sources, the sensor fusion operations may be capable of making inferences about the data that may not be possible from one of the data sources alone. For example, the sensor fusion operations implemented by the processor 102 may analyze video data (e.g., mouth movements of people) as well as the speech patterns from the directional audio DIR_AUD. The disparate sources may be used to develop a model of a scenario to support decision making. For example, the processor 102 may be configured to compare the synchronization of the detected speech patterns with the mouth movements in the video frames to determine which person in a video frame is speaking. The sensor fusion operations may also provide time correlation, spatial correlation and/or reliability among the data being received.

In some embodiments, the processor 102 may implement convolutional neural network capabilities. The convolutional neural network capabilities may implement computer vision using deep learning techniques. The convolutional neural network capabilities may be configured to implement pattern and/or image recognition using a training process through multiple layers of feature-detection. The computer vision and/or convolutional neural network capabilities may be performed locally by the processor 102. In some embodiments, the processor 102 may receive training data and/or feature set information from an external source. For example, an external device (e.g., a cloud service) may have access to various sources of data to use as training data that may be unavailable to the camera system 100*i*. However, the computer vision operations performed using the feature set may be performed using the computational resources of the processor 102 within the camera system 100*i*.

The signal DIR_AOUT may be an audio output. For example, the processor 102 may generate output audio based on information extracted from the video frames PIXELD_A-PIXELD_N. The signal DIR_AOUT may be determined based on an event and/or objects determined using the computer vision operations. In one example, the signal DIR_AOUT may comprise an audio message for people detected. In some embodiments, the signal DIR_AOUT may not be generated until an event has been detected by the processor 102 using the computer vision operations.

The signal DIR_AOUT may comprise directional and/or positional audio output information for the speakers 158*a*-158*n*. The speakers 158*a*-158*n* may receive the signal DIR_AOUT, process the directional and/or positional information and determine which speakers and/or which channels will play back particular audio portions of the signal DIR_AOUT. The speakers 158*a*-158*n* may generate the signals AOUT_A-AOUT_N in response to the signal DIR_AOUT. The signals AOUT_A-AOUT_N may be the audio message played. For example, the speakers 158*a*-158*n* may emit a pre-recorded message in response to a detected event. The signal DIR_AOUT may be a signal generated in a format that provides directional information for the signals AOUT_A-AOUT_N.

The number of speakers 158*a*-158*n* may be varied according to the design criteria of a particular implementation. The number of speakers 158*a*-158*n* may be selected to provide sufficient directional channels for the outgoing audio (e.g., the number of speakers 158*a*-158*n* implemented may be varied based on the accuracy and/or resolution of directional audio output). In an example, 1 to 6 of the speakers 158*a*-158*n* may be implemented. In some embodiments, an audio processing component may be implemented by the speakers 158*a*-158*n* to process and/or decode the output audio signals DIR_AOUT. In some embodiments, the processor 102 may be configured with on-chip audio processing. In some embodiments, the signal DIR_AOUT may playback audio received from remote devices (e.g., smartphones) in order to implement a 2-way real-time audio communication.

The video pipeline of the processor 102 may be configured to locally perform de-warping, cropping, enhancements, rolling shutter corrections, stabilizing, downscaling, packetizing, compression, conversion, blending, synchronizing and/or other video operations. The architecture of the video pipeline of the processor 102 may enable the video operations to be performed on high resolution video and/or high bitrate video data in real-time and/or near real-time. The video pipeline of the processor 102 may enable computer vision processing on 4K resolution video data, stereo vision processing, object detection, 3D noise reduction, fisheye lens correction (e.g., real time 360-degree dewarping and lens distortion correction), oversampling and/or high dynamic range processing. In one example, the architecture of the video pipeline may enable 4K ultra high resolution with H.264 encoding at double real time speed (e.g., 60 fps), 4K ultra high resolution with H.265/HEVC at 30 fps and/or 4K AVC encoding. The type of video operations and/or the type of video data operated on by the processor 102 may be varied according to the design criteria of a particular implementation.

The sensors 182*a*-182*n* may each implement a high-resolution sensor. Using the high resolution sensors 182*a*-182*n*, the processor 102 may combine over-sampling of the image sensors 182*a*-182*n* with digital zooming within a cropped area. The over-sampling and digital zooming may each be one of the video operations performed by the processor 102. The over-sampling and digital zooming may be implemented to deliver higher resolution images within the total size constraints of a cropped area.

In some embodiments, one or more of the lenses 150*a*-150*n* may implement a fisheye lens. One of the video operations implemented by the processor 102 may be a dewarping operation. The processor 102 may be configured to dewarp the video frames generated. The dewarping may be configured to reduce and/or remove acute distortion caused by the fisheye lens and/or other lens characteristics. For example, the dewarping may reduce and/or eliminate a bulging effect to provide a rectilinear image.

The processor 102 may be configured to crop (e.g., trim to) a region of interest from a full video frame (e.g., generate the region of interest video frames). The processor 102 may generate the video frames and select an area. In an example, cropping the region of interest may generate a second image. The cropped image (e.g., the region of interest video frame) may be smaller than the original video frame (e.g., the cropped image may be a portion of the captured video).

The area of interest may be dynamically adjusted based on the location of an audio source. For example, the detected audio source may be moving, and the location of the detected audio source may move as the video frames are captured. The processor 102 may update the selected region of interest coordinates and dynamically update the cropped section (e.g., the directional microphones 154*a*-154*n* may dynamically update the location based on the directional audio captured). The cropped section may correspond to the area of interest selected. As the area of interest changes, the cropped portion may change. For example, the selected coordinates for the area of interest may change from frame to frame, and the processor 102 may be configured to crop the selected region in each frame.

The processor 102 may be configured to over-sample the image sensors 182a-182n. The over-sampling of the image sensors 182a-182n may result in a higher resolution image. The processor 102 may be configured to digitally zoom into an area of a video frame. For example, the processor 102 may digitally zoom into the cropped area of interest. For example, the processor 102 may establish the area of interest based on the directional audio, crop the area of interest, and then digitally zoom into the cropped region of interest video frame.

The dewarping operations performed by the processor 102 may adjust the visual content of the video data. The adjustments performed by the processor 102 may cause the visual content to appear natural (e.g., appear as seen by a person viewing the location corresponding to the field of view of the capture devices 104a-104n). In an example, the dewarping may alter the video data to generate a rectilinear video frame (e.g., correct artifacts caused by the lens characteristics of the lenses 150a-150n). The dewarping operations may be implemented to correct the distortion caused by the lenses 150a-150n. The adjusted visual content may be generated to enable more accurate and/or reliable object detection.

Various features (e.g., dewarping, digitally zooming, cropping, etc.) may be implemented in the processor 102 as hardware modules. Implementing hardware modules may increase the video processing speed of the processor 102 (e.g., faster than a software implementation). The hardware implementation may enable the video to be processed while reducing an amount of delay. The hardware components used may be varied according to the design criteria of a particular implementation.

The processor 102 is shown comprising a number of blocks (or circuits) 190a-190n. The blocks 190a-190n may implement various hardware modules implemented by the processor 102. The hardware modules 190a-190n may be configured to provide various hardware components to implement a video processing pipeline. The circuits 190a-190n may be configured to receive the pixel data PIXELD_A-PIXELD_N, generate the video frames from the pixel data, perform various operations on the video frames (e.g., de-warping, rolling shutter correction, cropping, upscaling, image stabilization, etc.), prepare the video frames for communication to external hardware (e.g., encoding, packetizing, color correcting, etc.), parse feature sets, implement various operations for computer vision, etc. Various implementations of the processor 102 may not necessarily utilize all the features of the hardware modules 190a-190n. The features and/or functionality of the hardware modules 190a-190n may be varied according to the design criteria of a particular implementation. Details of the hardware modules 190a-190n and/or other components of the camera system 100i may be described in association with U.S. patent application Ser. No. 15/931,942, filed May 14, 2020, U.S. patent application Ser. No. 16/831,549, filed on Mar. 26, 2020, U.S. patent application Ser. No. 16/288,922, filed on Feb. 28, 2019, and U.S. patent application Ser. No. 15/593,493 (now U.S. Pat. No. 10,437,600), filed on May 12, 2017, appropriate portions of which are hereby incorporated by reference in their entirety.

The hardware modules 190a-190n may be implemented as dedicated hardware modules. Implementing various functionality of the processor 102 using the dedicated hardware modules 190a-190n may enable the processor 102 to be highly optimized and/or customized to limit power consumption, reduce heat generation and/or increase processing speed compared to software implementations. The hardware modules 190a-190n may be customizable and/or programmable to implement multiple types of operations. Implementing the dedicated hardware modules 190a-190n may enable the hardware used to perform each type of calculation to be optimized for speed and/or efficiency. For example, the hardware modules 190a-190n may implement a number of relatively simple operations that are used frequently in computer vision operations that, together, may enable the computer vision algorithm to be performed in real-time. The video pipeline may be configured to recognize objects. Objects may be recognized by interpreting numerical and/or symbolic information to determine that the visual data represents a particular type of object and/or feature. For example, the number of pixels and/or the colors of the pixels of the video data may be used to recognize portions of the video data as objects. The hardware modules 190a-190n may enable computationally intensive operations (e.g., computer vision operations, video encoding, video transcoding, etc.) to be performed locally on the camera 100i.

One of the hardware modules 190a-190n (e.g., 190a) may implement a scheduler circuit. The scheduler circuit 190a may be configured to store a directed acyclic graph (DAG). In an example, the scheduler circuit 190a may be configured to generate and store the directed acyclic graph in response to the feature set information received in the signal FEAT_SET. The directed acyclic graph may define the video operations to perform for extracting the data from the video frames. For example, the directed acyclic graph may define various mathematical weighting (e.g., neural network weights and/or biases) to apply when performing computer vision operations to classify various groups of pixels as particular objects.

The scheduler circuit 190a may be configured to parse the acyclic graph to generate various operators. The operators may be scheduled by the scheduler circuit 190a in one or more of the other hardware modules 190a-190n. For example, one or more of the hardware modules 190a-190n may implement hardware engines configured to perform specific tasks (e.g., hardware engines designed to perform particular mathematical operations that are repeatedly used to perform computer vision operations). The scheduler circuit 190a may schedule the operators based on when the operators may be ready to be processed by the hardware engines 190a-190n.

The scheduler circuit 190a may time multiplex the tasks to the hardware modules 190a-190n based on the availability of the hardware modules 190a-190n to perform the work. The scheduler circuit 190a may parse the directed acyclic graph into one or more data flows. Each data flow may include one or more operators. Once the directed acyclic graph is parsed, the scheduler circuit 190a may allocate the data flows/operators to the hardware engines 190a-190n and send the relevant operator configuration information to start the operators.

Each directed acyclic graph binary representation may be an ordered traversal of a directed acyclic graph with descriptors and operators interleaved based on data dependencies. The descriptors generally provide registers that link data buffers to specific operands in dependent operators. In various embodiments, an operator may not appear in the directed acyclic graph representation until all dependent descriptors are declared for the operands.

One of the hardware modules 190a-190n (e.g., 190b) may implement a convolutional neural network (CNN) module. The CNN module 190b may be configured to perform the computer vision operations on the video frames. The CNN module 190b may be configured to implement recognition of the objects and/or events through multiple layers of feature detection. The CNN module 190b may be configured to calculate descriptors based on the feature detection performed. The descriptors may enable the processor 102 to determine a likelihood that pixels of the video frames correspond to particular objects (e.g., the people, pets, items, text, etc.).

The CNN module 190b may be configured to implement convolutional neural network capabilities. The CNN module 190b may be configured to implement computer vision using deep learning techniques. The CNN module 190b may be configured to implement pattern and/or image recognition using a training process through multiple layers of feature-detection. The CNN module 190b may be configured to conduct inferences against a machine learning model.

The CNN module 190b may be configured to perform feature extraction and/or matching solely in hardware. Feature points typically represent interesting areas in the video frames (e.g., corners, edges, etc.). By tracking the feature points temporally, an estimate of ego-motion of the capturing platform or a motion model of observed objects in the scene may be generated. In order to track the feature points, a matching algorithm is generally incorporated by hardware in the CNN module 190b to find the most probable correspondences between feature points in a reference video frame and a target video frame. In a process to match pairs of reference and target feature points, each feature point may be represented by a descriptor (e.g., image patch, SIFT, BRIEF, ORB, FREAK, etc.). Implementing the CNN module 190b using dedicated hardware circuitry may enable calculating descriptor matching distances in real time.

The CNN module 190b may be a dedicated hardware module configured to perform feature detection of the video frames. The features detected by the CNN module 190b may be used to calculate descriptors. The CNN module 190b may determine a likelihood that pixels in the video frames belong to a particular object and/or objects in response to the descriptors. For example, using the descriptors, the CNN module 190b may determine a likelihood that pixels correspond to a particular object (e.g., a person, an item of furniture, a picture of a person, a pet, etc.) and/or characteristics of the object (e.g., a mouth of a person, a hand of a person, a screen of a television set, an armrest of a couch, a clock, etc.). Implementing the CNN module 190b as a dedicated hardware module of the processor 102 may enable the camera system 100i to perform the computer vision operations locally (e.g., on-chip) without relying on processing capabilities of a remote device (e.g., communicating data to a cloud computing service).

The computer vision operations performed by the CNN module 190b may be configured to perform the feature detection on the video frames in order to generate the descriptors. The CNN module 190b may perform the object detection to determine regions of the video frame that have a high likelihood of matching the particular object. In one example, the types of object to match against (e.g., reference objects) may be customized using an open operand stack (enabling programmability of the processor 102 to implement various directed acyclic graphs each providing instructions for performing various types of object detection). The CNN module 190b may be configured to perform local masking to the region with the high likelihood of matching the particular object(s) to detect the object.

In some embodiments, the CNN module 190b may determine the position (e.g., 3D coordinates and/or location coordinates) of various features (e.g., the characteristics) of the detected objects. In one example, the location of the arms, legs, chest and/or eyes may be determined using 3D coordinates. One location coordinate on a first axis for a vertical location of the body part in 3D space and another coordinate on a second axis for a horizontal location of the body part in 3D space may be stored. In some embodiments, the distance from the lenses 150a-150n may represent one coordinate (e.g., a location coordinate on a third axis) for a depth location of the body part in 3D space. Using the location of various body parts in 3D space, the processor 102 may determine body position, and/or body characteristics of the people 70a-70n.

The CNN module 190b may be pre-trained (e.g., configured to perform computer vision to detect objects based on the training data received to train the CNN module 190b). For example, the results of training data (e.g., a machine learning model) may be pre-programmed and/or loaded into the processor 102. The CNN module 190b may conduct inferences against the machine learning model (e.g., to perform object detection). The training may comprise determining weight values (e.g., neural network weights) for each of the layers. For example, weight values may be determined for each of the layers for feature extraction (e.g., a convolutional layer) and/or for classification (e.g., a fully connected layer). The weight values learned by the CNN module 190b may be varied according to the design criteria of a particular implementation.

The convolution operation may comprise sliding a feature detection window along the layers while performing calculations (e.g., matrix operations). The feature detection window may apply a filter to pixels and/or extract features associated with each layer. The feature detection window may be applied to a pixel and a number of surrounding pixels. In an example, the layers may be represented as a matrix of values representing pixels and/or features of one of the layers and the filter applied by the feature detection window may be represented as a matrix. The convolution operation may apply a matrix multiplication between the region of the current layer covered by the feature detection window. The convolution operation may slide the feature detection window along regions of the layers to generate a result representing each region. The size of the region, the type of operations applied by the filters and/or the number of layers may be varied according to the design criteria of a particular implementation.

Using the convolution operations, the CNN module 190b may compute multiple features for pixels of an input image in each extraction step. For example, each of the layers may receive inputs from a set of features located in a small neighborhood (e.g., region) of the previous layer (e.g., a local receptive field). The convolution operations may extract elementary visual features (e.g., such as oriented edges, end-points, corners, etc.), which are then combined by higher layers. Since the feature extraction window operates on a pixel and nearby pixels (or sub-pixels), the results of the operation may have location invariance. The layers may comprise convolution layers, pooling layers, non-linear layers and/or fully connected layers. In an example, the convolution operations may learn to detect edges from raw pixels (e.g., a first layer), then use the feature from the previous layer (e.g., the detected edges) to detect shapes in a next layer and then use the shapes to detect higher-level features (e.g., facial features, pets, furniture, etc.) in higher layers and the last layer may be a classifier that uses the higher level features.

The CNN module 190b may execute a data flow directed to feature extraction and matching, including two-stage detection, a warping operator, component operators that manipulate lists of components (e.g., components may be regions of a vector that share a common attribute and may be grouped together with a bounding box), a matrix inversion operator, a dot product operator, a convolution operator, conditional operators (e.g., multiplex and demultiplex), a remapping operator, a minimum-maximum-reduction operator, a pooling operator, a non-minimum, non-maximum suppression operator, a scanning-window based non-maximum suppression operator, a gather operator, a scatter operator, a statistics operator, a classifier operator, an integral image operator, comparison operators, indexing operators, a pattern matching operator, a feature extraction operator, a feature detection operator, a two-stage object detection operator, a score generating operator, a block reduction operator, and an upsample operator. The types of operations performed by the CNN module 190b to extract features from the training data may be varied according to the design criteria of a particular implementation.

Each of the hardware modules 190a-190n may implement a processing resource (or hardware resource or hardware engine). The hardware engines 190a-190n may be operational to perform specific processing tasks. In some configurations, the hardware engines 190a-190n may operate in parallel and independent of each other. In other configurations, the hardware engines 190a-190n may operate collectively among each other to perform allocated tasks. One or more of the hardware engines 190a-190n may be homogenous processing resources (all circuits 190a-190n may have the same capabilities) or heterogeneous processing resources (two or more circuits 190a-190n may have different capabilities).

Figure 4:
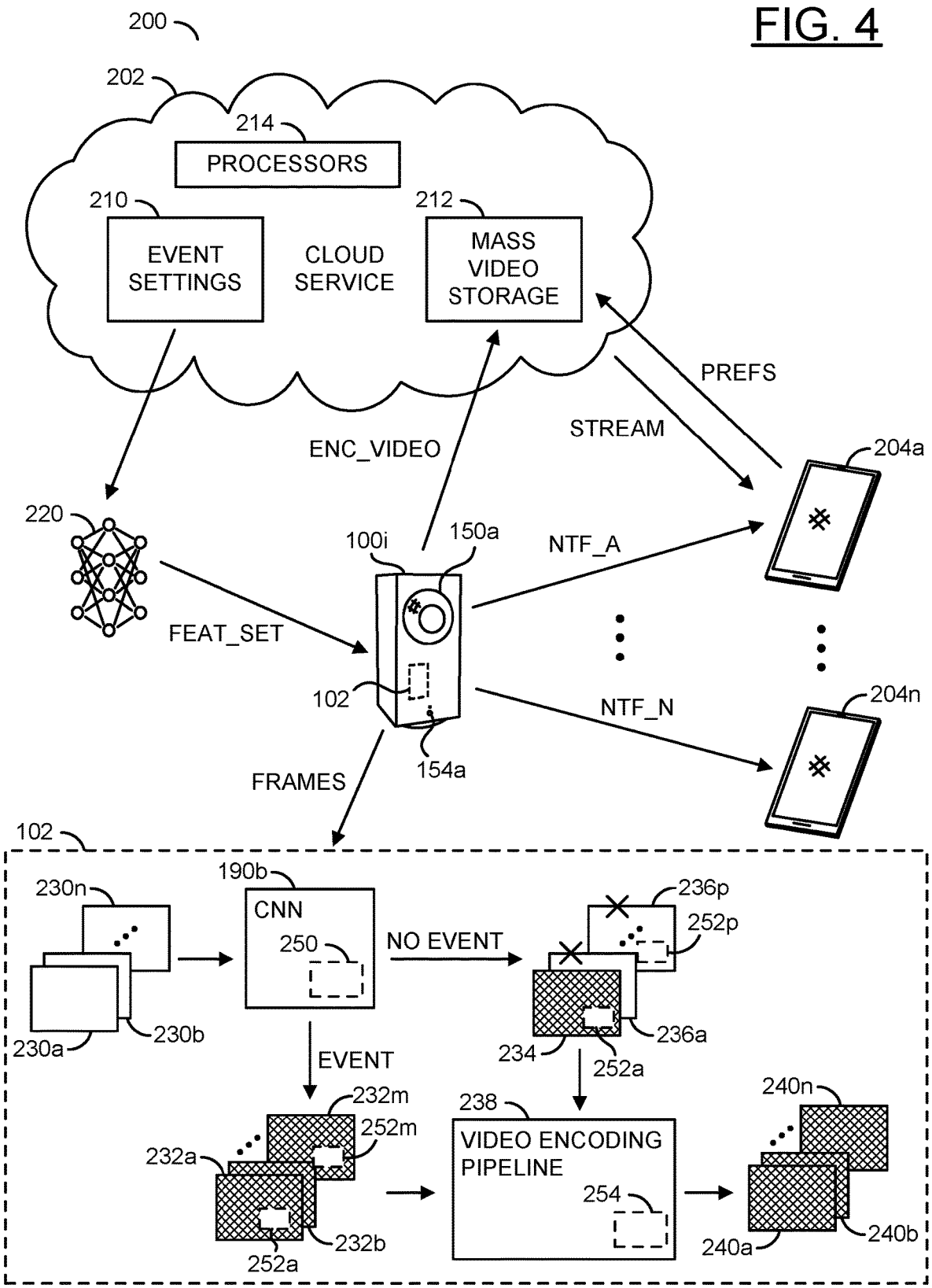
FIG. 4 is a diagram illustrating an interconnected camera communicating with a cloud server and a video processing pipeline for generating a timelapse video.

Referring to FIG. 4, a diagram illustrating an interconnected camera communicating with a cloud server and a video processing pipeline for generating a timelapse video is shown. An example scenario 200 is shown. The example scenario 200 may comprise the camera system 100i, a server 202 and/or remote devices 204a-204n. The lens 150a and the microphone 154a are shown on the camera system 100i. The processor 102 is shown within the camera system 100i. The example scenario 200 may further comprise a visualization of the processor 102 and/or a machine readable version of a DAG 220.

The server 202 may implement a cloud service. The cloud service 202 may comprise a block (or module) 210, a block (or module) 212 and/or a block (or module) 214. The module 210 may implement event settings storage. The module 212 may implement mass video storage. The event settings storage 210 and/or the mass video storage 212 may be implemented using one or more types of memory implemented by the cloud service 202. The module 214 may implement one or more processors. The cloud service 202 may comprise other components (not shown). The number, type and/or arrangement of the components of the cloud service 202 may be varied according to the design criteria of a particular implementation.

The cloud service 202 may be implemented as part of a cloud computing platform (e.g., distributed computing). In an example, the cloud service 202 may be implemented as a group of cloud-based, scalable server computers. By implementing a number of scalable servers, additional resources (e.g., power, processing capability, memory, etc.) may be available to process and/or store variable amounts of data. For example, the cloud service 202 may be configured to scale (e.g., provision resources) based on demand. The cloud service 202 may implement scalable computing (e.g., cloud computing). The scalable computing may be available as a service to allow access to processing and/or storage resources without having to build infrastructure.

In some embodiments, the cloud service 202 may be configured to provide resources such as training data and/or a database of feature maps (e.g., feature maps of recognized objects that may be used as a basis to perform object recognition and/or classification). Generating the feature maps may be performed by the cloud service 202 since the cloud service 202 may have access to a large amount of training data (e.g., all the video frames uploaded by the cameras 100a-100n and/or other devices). Feature maps and/or training data may be stored in the event settings storage 210. The event settings storage 210 may be configured to provide a feature set to the camera system 100i in response to the particular events and/or objects selected for detection. In one example, individual users may select different types of events and/or objects to detect (e.g., objects of interest). The types of feature sets provided to the camera system 100i may be varied depending on the objects of interest selected by each user.

In some embodiments, the cloud service 202 may be configured to provide storage resources. The mass video storage 212 may be configured to provide long-term storage of video data. For example, the cloud service 202 may comprise storage resources (e.g., hard drives, solid state drives, etc.) that enable considerably more storage capacity than available internally on the camera system 100i.

The cloud service 202 may be have access to considerably more bandwidth capacity than the camera system 100i. The bandwidth capacity available to the cloud service 202 may enable the cloud service 202 to stream video to the remote devices 204a-204n. A signal (e.g., STREAM) is shown. The signal STREAM may represent streaming video communicated to one or more of the remote devices 204a-204n.

The remote devices 204a-204n may be various user devices. In the example shown, the remote devices 204a-204n may be smartphones. In another example, the remote devices 204a-204n may be desktop computers, laptop computers, tablet computing devices, smartwatches, etc. The types of remote devices 204a-204n implemented may be varied according to the design criteria of a particular implementation.

The remote devices 204a-204n may enable end users to communicate with the camera systems 100a-100n and/or the cloud service 202. In one example, a companion application may be configured to operate on the remote devices 204a-204n. The companion application may enable users to adjust settings of the camera systems 100a-100n. The companion application may enable users to view video captured by the camera systems 100a-100n (e.g., directly from the camera systems 100a-100n and/or streamed via the cloud service 202). For example, the remote devices 204a-204n may be configured to receive the signal STREAM and playback the video stream to the end user.

A signal (e.g., PREFS) is shown. The signal PREFS may provide user preferences to the cloud service 202. In an example, the companion app implemented on the remote devices 204a-204n may enable the end users to adjust various settings for the camera systems 100a-100n and/or the video captured by the camera systems 100a-100n. In some embodiments, the settings may be stored in the cloud service 202 as the event settings storage 210 (e.g., using a secured account). The signal PREFS may comprise the objects and/or events of interest selected by the user. In one example, the signal PREFS may enable the user to select people and animals as the objects and/or events of interest. The data from the signal PREFS may be stored in the event settings storage 210.

The edge AI camera 100i may be configured to communicate with the remote cloud service 202 and/or the user devices (e.g., smartphones) 204a-204n. The edge AI camera 100i may be a representative example of any of the camera systems 100a-100n. The edge AI camera 100i is shown communicating the signal ENC_VIDEO, a signal (e.g., FRAMES) and/or one or more signals (e.g., NTF_A-NTF_N). The edge AI camera 100i is shown receiving the signal FEAT_SET. The signal FRAMES may comprise video frames generated by the processor 102 in response to the pixel data PIXELD_A-PIXELD_N. The signals NTF_A-NTF_N may be notification signals communicated to the remote devices 204a-204n. The edge AI camera 100i may be configured to communicate and/or generate other signals (not shown). The number, type and/or format of the signals communicated and/or generated by the edge AI camera 100i may be varied according to the design criteria of a particular implementation.

The edge AI camera 100i may be configured to upload the encoded video frames ENC_VIDEO to the cloud service 202. The edge AI camera 100i may encode the video frames before uploading to limit an amount of bandwidth consumed compared to uploading unencoded video frames. In some embodiments, the encoded video frames ENC_VIDEO may comprise all of the video data generated by the edge AI camera 100i. In some embodiments, the encoded video frames ENC_VIDEO may comprise the smart timelapse video generated internally by the edge AI camera 100i.

The signals NTF_A-NTF_N may comprise notifications that may be accessed using the remote devices 204a-204n. In one example, the notification signals NTF_A-NTF_N may provide a message that a particular object and/or event has been detected. For example, the notification may comprise a text message such as, "A person has been detected at 2:54 pm" and a link to the video comprising the corresponding object and/or event. In the example shown, the notification signals NTF_A-NTF_N may be generated by the edge AI camera 100i (e.g., direct communication between the camera system 100i and the remote devices 204a-204n). In some embodiments, the signals NTF_A-NTF_N may be combined with the signal ENC_VIDEO (e.g., the smart timelapse video stream may be sent directly from the edge AI camera 100i to one or more of the remote devices 204a-204n along with the notification).

In some embodiments, the notification signals NTF_A-NTF_N may be generated by the cloud service 202. For example, the edge AI camera 100i may be configured to tag the video frames with metadata about the particular objects detected. The cloud service 202 may compare the metadata in the video frames uploaded to the cloud service 202 with the event settings storage 210. When the cloud service 202 detects a match between the metadata in the video frames and the event settings for a particular user, the cloud service 202 may communicate one of the signals NTF_A-NTF_N to the appropriate one of the remote devices 204a-204n. In an example, the cloud server 202 may securely store the contact information for the owners of the smartphones 204a-204n (e.g., user information about registered users).

A machine readable DAG 220 of the event settings 210 is shown. The machine readable DAG 220 may comprise a neural network and/or computer readable instructions that define the types of objects and/or events that may be detected by the processor 102 of the camera system 100i. For example, the machine readable DAG 220 may be generated according to an API (e.g., a format) compatible with the camera system 100i. The machine readable DAG 220 may comprise one or more neural networks (e.g., each neural network may correspond to various types of objects to detect based on the event settings 210). The machine readable DAG 220 may be provided to the camera system 100i in the signal FEAT_SET.

The camera system 100i may receive the signal FEAT_SET from the cloud service 202. The processor 102 may convert the feature set information in the signal FEAT_SET to detection parameters. The camera system 100i may capture pixel data and generate the video frames from the pixel data PIXELD_A-PIXELD_N. The camera system 100i is shown generating the signal FRAMES. The signal FRAMES may comprise the video frames generated by the processor 102. The signal FRAMES may comprise data used internally by the processor 102. In an example, the signal FRAMES (e.g., unencoded video frames) may not be communicated from the camera system 100i.

The user may select settings using an app on the smartphones 204a-204n (e.g., the signal PREFS). The preferences may be stored as the event settings 210 in the cloud service 202. The cloud service 202 may be configured to provide neural network parameters (e.g., the feature set) for the processor 102 in response to the event settings 210 for a particular user (e.g., the signal FEAT_SET). The processor 102 may receive the feature set to detect objects/events. The edge AI camera 100i may be configured to upload the encoded video frames (e.g., the smart timelapse video) to the cloud service 202. The encoded video frames ENC_VIDEO may be stored in the mass video storage 212 of the cloud service 202. The user may access the encoded video frames using the smartphones 204a-204n. In an example, the smartphones 204a-204n may connect to the mass video storage 212 and download the smart timelapse video. The cloud service 202 and/or the edge AI camera 100i may further provide notifications (e.g., the signals NTF_A-NTF_N) to the smartphones 204a-204n based on content in the metadata tags of the smart timelapse video.

A video processing pipeline of the processor 102 is shown. The video processing pipeline of the processor 102 may comprise the CNN module 190b, raw video frames 230a-230n, selected event video frames 232a-232m, a selected non-event video frame 234, non-selected video frames 236a-236p, a block (or circuit) 238 and/or encoded video frames 240a-240n. The circuit 238 may implement a video encoding pipeline. The video processing pipeline may be implemented using one or more of the hardware modules 190a-190n. The video processing pipeline of the processor 102 may comprise other components and/or data (not shown). The number, type and/or arrangement of the components and/or data in the video processing pipeline of the processor 102 may be varied according to the design criteria of a particular implementation.

The processor 102 may generate raw video frames 230a-230n in response to the pixel data captured by the capture devices 104a-104n. For example, the raw video frames 230a-230n may be the data in the signal FRAMES. The raw video frames 230a-230n may be analyzed by the CNN module 190b. The CNN module 190b may comprise a block (or circuit) 250. The block 250 may comprise an AI model (e.g., the DAG). The CNN module 190b may be configured to detect objects and/or events of interest based on the preferences of the user (e.g., detect one or all of people, vehicles, animals, movement, sound, etc. as an event). The AI model 250 may be configured to implement the machine readable DAG 220 to detect various objects and/or events.

The CNN module 190*b* may be configured to tag the video frames 230*a*-230*n* when an event is detected (e.g., the interesting video frames). The CNN module 190*b* may be configured to determine which of the video frames 230*a*-230*n* have no event detected (e.g., uninteresting video frames). The event video frames 232*a*-232*m* are shown corresponding to an event detected. Generally, there may be fewer event video frames 232*a*-232*m* than original video frames 230*a*-230*n* (e.g., not every video frame captured may capture pixel data of an event). The selected non-event video frame 234 and the non-selected video frames 236*a*-236*p* are shown corresponding to no event being detected. Generally, there may be fewer non event video frames 236*a*-236*p* than original video frames 230*a*-230*n* (e.g., not every video frame captured may capture pixel data of non-events).

The CNN module 190*b* may be configured to perform object detection, classify objects, and/or extract data from the video frames 230*a*-230*n*. The CNN module 190*b* may compare the data extracted (e.g., various symbols and/or confidence values indicating the likelihood that particular objects were detected) with the detection parameters (e.g., the feature set information) of the signal FEAT_SET according to the machine readable DAG 220 to determine whether or not an object and/or event of interest has been detected. In an example, the feature set signal FEAT_SET may provide instructions to detect an event when there are more than three visitors detected and the camera system 100*i* may use the detection parameters to monitor whether more than three visitors have been detected in the video frames 230*a*-230*n*. In some embodiments, the CNN module 190*b* and/or audio analytics modules may determine when an object of interest and/or event has been detected. For example, the event may comprise an amplitude and/or type of audio detected, an event and/or object detected using computer vision operations and/or a combination of audio and video analysis (e.g., using computer vision to detect a person and using audio analysis to determine if the person is making a lot of noise).

The event video frames 232*a*-232*m* may comprise respective metadata tags 252*a*-252*m*. Similarly, the selected non-event video frame 234 and the non-selected video frames 236*a*-236*p* may comprise corresponding metadata tags 252*a*-252*p*. The metadata tags 252*a*-252*m* (and the metadata tags 252*a*-252*p*) may comprise labels that indicate the objects, characteristics and/or events detected by the CNN module 190*b* and/or a timestamp indicating when (or in which order) the video frames were captured. In some embodiments, the metadata tags 252*a*-252*m* may be used to generate training data (e.g., the metadata tags 252*a*-252*m* may be tagged as correct and/or incorrect based on whether the metadata tags 252*a*-252*m* accurately identify the objects, events and/or characteristics). The training data may be used to refine the feature set used to detect objects (e.g., to adjust neural network weight values and/or bias values for the AI model 250).

The event video frames 232*a*-232*m* that are tagged with an event may be provided to the video encoding pipeline 238. The event video frames 232*a*-232*m* may be encoded at an adjusted frame rate (e.g., either at the same framerate as the full original video frames 230*a*-230*n* or at higher framerate than when no event is detected). Of the video frames 230*a*-230*n* that do not comprise an event/object of interest, the processor 102 may select one video frame (e.g., the selected non-event video frames 234) for each duration of length N. For example, the processor 102 may select one non-event video frame 234 from a duration of N (e.g., from the group of non-event video frames comprising the selected non-event video frame 234 and the non-selected video frames 236*a*-236*p*) where video is captured at 60 fps (e.g., select one frame from the 60 frames captured in one second).

The video frames that are not selected (e.g., the non-selected video frames 236*a*-236*p*), may not be included in the smart timelapse video stream. In one example, the non-selected video frames 236*a*-2365*p* may be discarded (e.g., not stored). In another example, the non-selected video frames 236*a*-236*p* may be used in a recording (e.g., the recording of the full video stream that may be stored local in the memory 160 of the camera device 100*i*, on a microSD card, etc.). The selected non-event video frame 234 may be presented to the video encoding pipeline 238 for encoding into the smart timelapse video along with the event video frames 232*a*-232*m*.

The video encoding pipeline 238 may be configured to encode video frames in real time (e.g., HEVC, AVC, H264, etc.). The video encoding pipeline 238 may be configured to generate the encoded video frames 240*a*-240*n*. The encoded video frames 240*a*-240*n* may be the smart timelapse video.

The video encoding pipeline 238 may insert the selected video frames (e.g., the event video frames 232*a*-232*n* and the selected non-event video frame(s) 234) into the encoded video 240*a*-240*n* in order based on time captured. For example, each video frame may have a timestamp with the metadata 252*a*-252*m* and the video frames may be inserted into the encoded video 240*a*-240*n* in order of timestamp (e.g., earliest video frames first to create a chronologically ordered video). The video encoding pipeline 238 may generate the encoded video 240*a*-240*n* with the video frames having the event 232*a*-232*m* (displaying at normal speed), and the video frames of the non-event 234 (displaying at a faster speed since fewer frames are selected). Generally, there may be fewer of the encoded video frames 240*a*-240*n* than the originally captured raw video frames 230*a*-230*n* (e.g., the non-selected video frames 236*a*-236*p* may not be included in the encoded video frames 240*a*-240*n*).

The video encoding pipeline 238 may comprise a block (or module) 254. The module 254 may be configured to apply various effects to the selected video frames. For example, the module 254 may be configured to crop the selected video frames, dewarp the selected video frames, apply colorization (or remove color) from the selected video frames, apply blurs to sections of the video frames, etc. In an example, a blur effect may be applied to portions of the selected video frames to hide and/or censor particular objects (e.g., hide the identity of a known person for privacy reasons, hide naked body parts to prevent nudity from being uploaded, etc.).

The processor 102 may be configured to perform the computer vision operations before the video frames 230*a*-230*n* are encoded. Performing the computer vision operations before the video frames 230*a*-230*n* are encoded may enable the computer vision operations to be performed without the cycle cost of first decoding the video frames. For example, if the computer vision is performed by the cloud service 202, the encoded video frames 240*a*-240*n* are sent to the cloud servers 202 and the cloud server 202 wastes CPU cycles and power by first decoding the encoded video frames 240*a*-240*n*, and then performing the computer vision operations and then transcoding the timelapse video.

The processor 102 may be configured to perform the selection of the video frames 230*a*-230*n* for the smart timelapse video entirely local to the edge AI camera 100*i*. The processor 102 may implement the CNN module 190*b*. The CNN module 190*b* may be a hardware component (or multiple hardware components working together) of the processor 102 that implements CNN-based detection techniques (or other types of detection techniques) that operate entirely on the processor 102 to perform computer vision operations such as object detection, object tracking, object classification, etc. The hardware accelerated CNN module 190*b* may enable the object/event detection to be performed on the camera system 100*i* (e.g., without relying on computing resources of the cloud server 202 to perform object detection).

In some embodiments, the processor 102 may use software acceleration for computer vision and/or a combination of hardware accelerated and software accelerated computer vision. With computer vision operations running on either a hardware based CNN engine 190*b* and/or a software based CNN engine, the processor 102 implemented in the edge device 100*i* may be able to detect events of one or more types, and apply event tags 252*a*-252*m* to the video frames captured.

The processor 102 may be configured to generate the encoded video frames 240*a*-240*n* from the pixel data received from the capture devices 104*a*-104*n*. The processor 102 may be configured to select video frames to be encoded for the smart timelapse video. The video frames may be selected in response to the objects/events detected by the CNN module 190*b*. The scheduler circuit 190*a* may load a directed acyclic graph (DAG) comprising parameters for detecting various types of objects/events. For example, different DAGs may be loaded in response to the types of events of interest selected by the user. The signal FEAT_SET may comprise parameters for video (e.g., pet detection, types of pets, behavior, number of people in an area, locations of particular items, etc.). The signal FEAT_SET may further comprise parameters for audio (e.g., a maximum audio level, particular frequencies to detect, times of day that particular audio levels are to be detected, etc.). Generally, the processor 102 may compare the characteristics detected in the video frames 230*a*-230*n* with the events and/or objects of interest defined by the user by using the parameters defined by the feature set information. The information provided in the feature set information may be varied according to the design criteria of a particular implementation.

Figure 5:
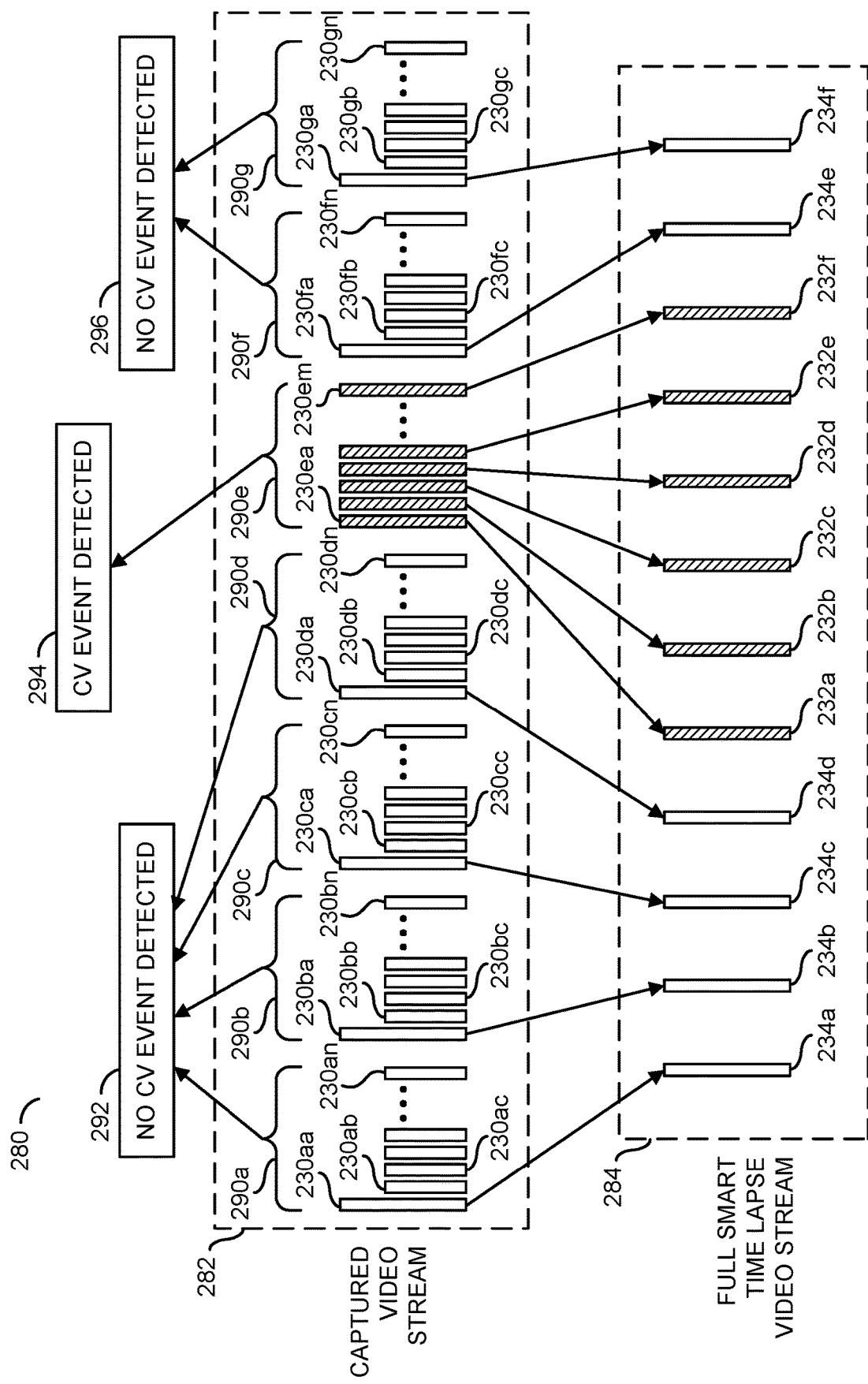
FIG. 5 is a diagram illustrating a smart timelapse mode on an edge AI camera with CV analysis using all frames of an event.

Referring to FIG. 5, a diagram illustrating a smart timelapse mode on an edge AI camera with CV analysis using all frames of an event is shown. An example scenario 280 is shown. The example scenario 280 may comprise a captured video stream 282 and a full smart timelapse video stream 284. The captured video stream 282 may be generated by the processor 102 (e.g., the signal FRAMES) in response to the pixel data PIXELD_A-PIXELD_N captured by the capture devices 104*a*-104*n*. The full smart timelapse video stream 284 may be generated by the processor 102 (e.g., the signal ENC_VIDEO) in response to the objects and/or events detected by the CNN module 190*b*.

The captured video stream 282 is shown comprising a stream of video frames. The stream of video frames may comprise groups of pictures (GOP) 290*a*-290*n*. Each of the GOPs 290*a*-290*n* may comprise the video frames 230*a*-230*n* generated by the processor 102. In one example, each of the GOPs 290*a*-290*d* and 290*f*-290*g* may comprise video frames 230*a*-230*n* for a duration of N length and the GOP 290*e* may comprise video frames 230*a*-230*n* for a duration of M length. The CNN module 190*b* may perform the computer vision operations to determine which of the video frames 230*a*-230*n* comprise a CV event (e.g., as shown in association with FIG. 4).

Categories 292-296 are shown. The category 292 may comprise no CV event detected. The category 294 may comprise a CV event detected. The category 296 may be the same as the category 292 (e.g., no CV event detected). The categories 292-296 may be determined based on the metadata tags 252*a*-252*m* applied by the CNN module 190*b*. The CV event may be determined in response to detecting an event and/or object of interest as defined by the feature set used by the processor 102.

The first four N duration groups of video frames 290-290*d* may not comprise a CV event. The GOPs 290*a*-290*d* are shown as part of the no CV event category 292. After the four non-event groups, a CV event may be detected (e.g., of duration M in the GOP 290*e*). The GOP 290*e* is shown as part of the CV event category 294. After the duration M of the CV event, two more N duration groups of video frames 290*f*-290*g* that comprise no CV event may be detected. The GOPs 290*f*-290*g* are shown as part of the no CV event category 296.

Each of the N duration GOPs 290*a*-290*d* and 290*f*-290*g* may comprise the video frames 230*a*-230*n*. In the example shown, the GOP 290*a* may comprise the video frames shown as 230*aa*-230*an*, the GOP 290*b* may comprise the video frames shown as 230*ba*-230*bn*, the GOP 290*c* may comprise the video frames shown as 230*ca*-230*cn*, etc. The M duration GOP 290*e* may comprise the video frames 230*a*-230*n*. In the example shown, the GOP 290*e* may comprise the video frames shown as 230*ea*-230*em*.

Video frames from each of the GOPs 290*a*-290*g* may be selected for the full smart timelapse video stream 284. In the example shown, one video frame from each of the no CV event GOPs 290*a*-290*d* and 290*f*-290*g* may be selected for the full smart timelapse video stream 284 and all of the video frames from the CV event GOP 290*e* may be selected for the full smart timelapse video stream 284. In some embodiments, more than one video frame may be selected from each of the no CV event GOPs 290*a*-290*d* and 290*f*-290*g*. The number of video frames selected from the no CV event GOPs 290*a*-290*d* and 290*f*-290*g* may be varied according to the design criteria of a particular implementation.

One of the video frames from each of the first four N duration groups 290*a*-290*d* may be selected by the processor 102 for the full smart timelapse video 284 (e.g., four non-event video frames are selected). In the example shown, the video frame 230*aa* from the GOP 290*a* may be the selected non-event video frame 234*a*, the video frame 230*ba* from the GOP 290*b* may be the selected non-event video frame 234*b*, the video frame 230*ca* from the GOP 290*c* may be the selected non-event video frame 234*c* and the video frame 230*da* from the GOP 290*d* may be the selected non-event video frame 234*d*. The selected non-event video frames 234*a*-234*d* may be selected in chronological order. For example, the selected non-event video frame 234*a* may be captured at an earlier time than the selected non-event video frame 234*b*. Selecting less than all of the video frames from the non-event GOPs 290*a*-290*d* may result in a higher frame rate (faster playback speed) for the full smart timelapse video stream 284 for the selected non-event video frames 234*a*-234*n* than the original captured video stream 282 for the GOPs 290*a*-290*d*.

For a full smart timelapse video 284, all the video frames for the duration M that have the CV event may be selected. In the example shown, the duration M may be six event video frames 232*a*-232*f*. All six video frames with the CV event 294 from the GOP 290e may be selected for the full smart timelapse video 284. In the example shown, the video frame 230ea may be the event video frame 232a, the video frame 230eb may be the event video frame 232b, the video frame 230ec may be the event video frame 232c, the video frame 230ed may be the event video frame 232d, the video frame 230ee may be the event video frame 232e and the video frame 230em may be the event video frame 232f. While six video selected video frames 232a-232f are shown for illustrative purposes, the full smart timelapse video 284 may comprise all of the video frames 230ea-230em from the event GOP 290e. The event video frames 232a-232f may be selected in chronological order. For example, the event frames 232a-232f may be captured at later time than the selected non-event video frames 234a-234d. Selecting all of the video frames 230ea-230em from the event GOP 290e may result in a same frame rate for the full smart timelapse video stream 284 for the event video frames 234a-234f as the original captured video stream 282 for the GOP 290e. For example, the effective framerate of the full smart timelapse video stream 284 may appear slower for the event video frames 232a-232n compared to the selected non-event video frames 234a-234d.

After the event 294 has ended, the frame rate for video selection may be re-adjusted back to the default (e.g., higher) rate. For example, one video frame may be selected for each of the next two non-event N duration groups of video frames 290f-290g. In the example shown, the video frame 230fa from the GOP 290f may be the selected non-event video frame 234e and the video frame 230ga from the GOP 290g may be the selected non-event video frame 234f. The selected non-event video frames 234e-234f may be selected in chronological order. For example, the selected non-event video frame 234f may be captured at a later time than the event video frames 232a-232f. Selecting less than all of the video frames from the non-event GOPs 290f-290g may result in a higher frame rate for the full smart timelapse video stream 284 for the selected non-event video frames 234a-234n than the original captured video stream 282 for the GOPs 290f-290g. For example, the effective framerate of the full smart timelapse video stream 284 may appear faster for the selected non-event video frames 234e-234f compared to the event video frames 232a-232f.

In the example shown, the first video frames 230aa-230ga are shown selected from the respective non-event GOPs 290a-290d and 290f-290g for the selected non-event video frames 234a-234f. While the first video frame is shown selected from the non-CV event groups of video frames, any one of the video frames from each of the non-CV event groups 290a-290d and 290f-290g may be selected according to the design criteria of a particular implementation (e.g., each second video frame may be selected).

The full smart timelapse video 284 may be the encoded video stream ENC_VIDEO presented to the cloud service 202. The full smart timelapse video stream 284 may be played back by one of the remote devices 204a-204n. The full smart timelapse video stream 284 may be played back at a normal frame rate.

Since there are fewer selected non-event video frames 234a-234d and 234e-234f to playback from the non-CV portion of the encoded video frames (e.g., compared to the total number of frames in each of the non-CV GOPs 290a-290d and 290f-290g), the playback of the non-CV portion (e.g., the selected non-event video frames 234a-234d and 234e-234f) of the full smart timelapse video stream 284 may appear to playback at a higher speed than real-time. For example, if there have been 60 non-CV event groups of video frames detected, one video frame may be selected from each for the full smart timelapse video 284. Playback of the full smart timelapse video 284 at 60 fps may result in the non-CV event groups being played back in a condensed form of one second (e.g., a higher effective framerate). Since all of the video frames for the CV event 294 have been selected (e.g., each of the video frames 230ea-230em from the GOP 290e), the playback of the portion of the full smart timelapse video stream 284 for the event video frames 232a-232f may be played back at normal speed (e.g., in real-time). Since the non-CV event video frames in the full smart timelapse video stream 284 may represent a condensed version of the original captured video stream 282, the full smart timelapse video stream 284 may provide a video stream comprising generally the same content (e.g., in terms of objects and/or events of interest) that may be reviewed by a person faster (e.g., using fewer man-hours).

The processor 102 may generate the full smart timelapse video 284 based on detected events (or objects). The CNN module 190b may detect the events and tag the event video frames 232a-232m corresponding to a particular event. In one example, the video frame (e.g., Frame N) may correspond to an Event A and an Event B, and the next one hundred video frames after Frame N (e.g., Frames N+100) may correspond to the Event B only. The processor 102 may be configured to combine the selected frames, by selecting some video frames from the video that do not have events (e.g., usually choose an I-frame only), and then choose all of the video frames that have the Event A tag. The encoding device 238 may then create a smart time elapse video (e.g., a condensed video) including Event A (e.g., by finding the Frame N and any adjacent frames with the Event A tag may be selected). Similarly, a distinct smart timelapse video (e.g., a separate video file) may be generated for the Event B (e.g., by finding the video frame Frame N and the next frames Frames N+100 that have the Event B tag).

Figure 6:
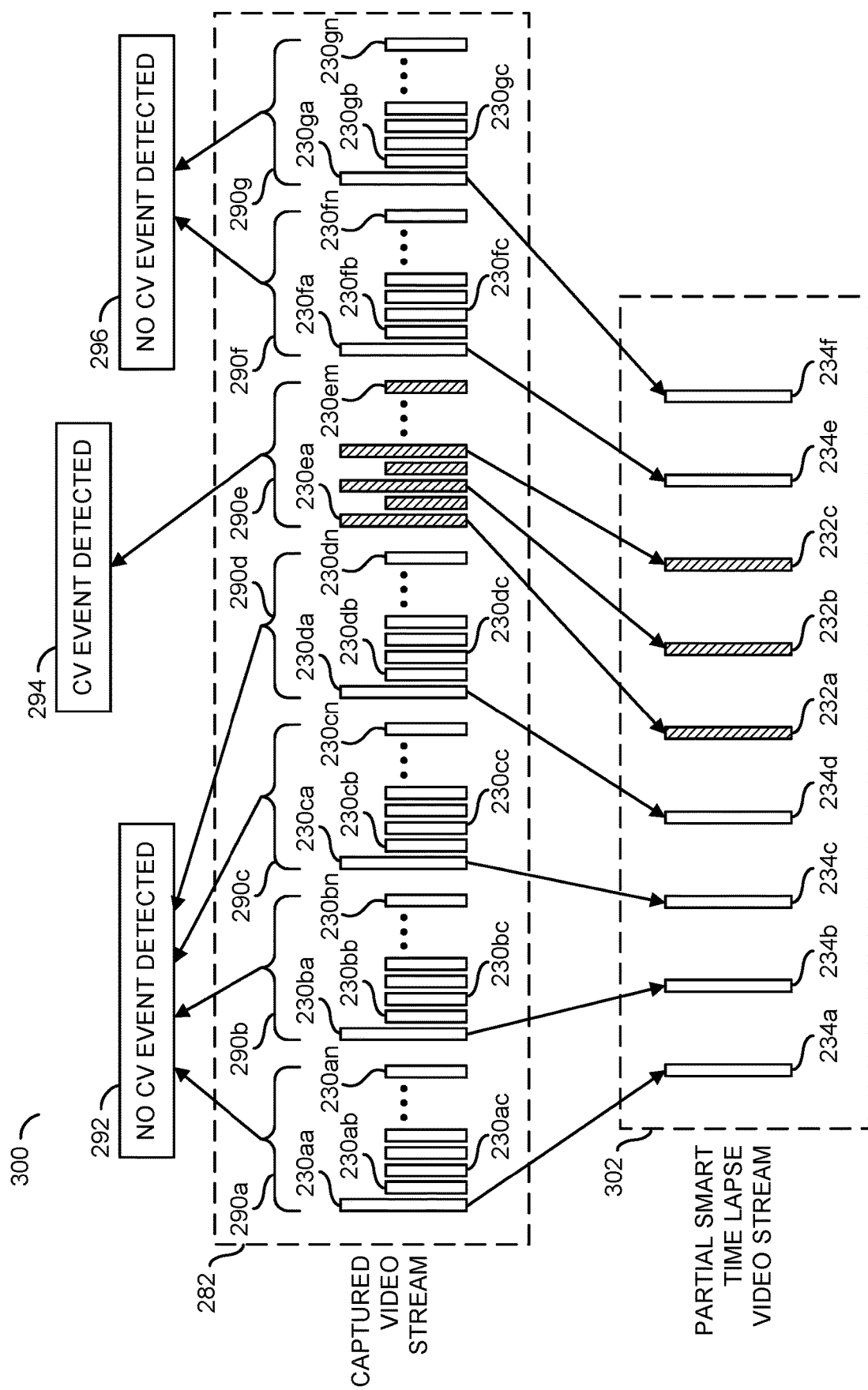
FIG. 6 is a diagram illustrating a smart timelapse mode on an edge AI camera with CV analysis using partial frames of an event.

Referring to FIG. 6, a diagram illustrating a smart time-lapse mode on an edge AI camera with CV analysis using partial frames of an event is shown. An example scenario 300 is shown. The example scenario 300 may comprise the captured video stream 282 and a partial smart timelapse video stream 302.

The captured video stream 282 may have a similar implementation as the captured video stream 282 described in association with FIG. 5. The capture video stream 282 may comprise the GOPs 290a-290g. The GOPs 290a-290d may each be the duration N and comprise the video frames 230aa-230an, the video frames 230ba-230bn, the video frames 230ca-230cn and the video frames 230da-dn, respectively. The GOPs 290a-290d may be analyzed by the CNN module 190b and be categorized as the No CV event category 292. The GOP 290e may be the duration M and comprise the video frames 230ea-230em. The GOP 290e may be analyzed by the CNN module 190b and be categorized as the CV event 294. The GOPs 290f-290g may each be the duration N and comprise the video frames 230fa-230fn and the video frames 230ga-230gn, respectively. The GOPs 290f-290g may be analyzed by the CNN module 190b and be categorized as the No CV event category 296.

In the partial smart timelapse video stream 302, not all of the video frames 230ea-230em (e.g., the video frames of the GOP 290e) that correspond to the CV event 294 may be selected. Not selecting all of the video frames 230ea-230em of the CV event 294 may result in the partial smart timelapse video 302 providing a condensed view of the CV event 294 that still provides more video frames (e.g., more detail, a slower playback speed) than the condensed view of the non-CV event video frames selected (e.g., the video frames selected from the GOPs 290a-290d and 290f-290g). For example, the partial smart timelapse video stream 302 may have a higher effective framerate (e.g., faster playback speed) than the full smart timelapse video stream 284 shown in association with FIG. 5, but a lower effective framerate (e.g., slower playback speed) than the captured video stream 282.

Video frames from each of the GOPs 290a-290g may be selected for the partial smart timelapse video stream 302. In the example shown, one video frame from each of the no CV event GOPs 290a-290d and 290f-290g may be selected for the partial smart timelapse video stream 302 and less than all (e.g., a subset) of the video frames from the CV event GOP 290e may be selected for the partial smart timelapse video stream 302. In some embodiments, more than one video frame may be selected form each of the no CV event GOPs 290a-290d and 290f-290g. The number of video frames selected from the no CV event GOPs 290a-290d and 290f-290g and/or the CV event GOP 290e may be varied according to the design criteria of a particular implementation.

One of the video frames from each of the first four N duration groups 290a-290d may be selected by the processor 102 for the partial smart timelapse video 302 (e.g., four non-event video frames are selected). In the example shown, the video frame 230aa from the GOP 290a may be the selected non-event video frame 234a, the video frame 230ba from the GOP 290b may be the selected non-event video frame 234b, the video frame 230ca from the GOP 290c may be the selected non-event video frame 234c and the video frame 230da from the GOP 290d may be the selected non-event video frame 234d. The selected non-event video frames 234a-234d may be selected in chronological order. For example, the selected non-event video frame 234a may be captured at an earlier time than the selected non-event video frame 234b. Selecting less than all of the video frames from the non-event GOPs 290a-290d may result in a higher frame rate for the partial smart timelapse video stream 302 for the selected non-event video frames 234a-234n than the original captured video stream 282 for the GOPs 290a-290d.

For the partial smart timelapse video 302, a subset of the video frames 230ea-230em for the duration M that have the CV event may be selected. In the example shown, three of the event video frames 232a-232c may be selected. Three of the video frames with the CV event 294 from the GOP 290e may be selected for the partial smart timelapse video 302. In the example shown, every other one of the video frames 230ea-230em that correspond to the CV event 294 may be selected. In another example, every Jth frame in the GOP 290e may be selected (e.g., the duration J may be less than the duration N for the selected non-event video frames 234a-234d). Other patterns may be selected (e.g., half the video frames, groups of 2 video frames, a random sample of the video frames, etc.). The particular pattern and/or number of the video frames 230ea-230em that correspond to the CV event 294 that may be selected for the partial smart timelapse video stream 302 may be varied according to the design criteria of a particular implementation.

In the example shown, the video frame 230ea may be the event video frame 232a, the video frame 230ec may be the event video frame 232b and the video frame 230ee may be the event video frame 232c. The non-selected video frames that correspond to the CV event 294 (e.g., the video frame 230eb, the video frame 240ed, the video frame 230ef, etc.) may be discarded similar to the non-selected no CV event video frames 236a-236p. The event video frames 232a-232c may be selected in chronological order. For example, the event frames 232a-232c may be captured at later time than the selected non-event video frames 234a-234d. Selecting a subset of the video frames 230ea-230em from the event GOP 290e may result in a higher effective frame rate for the partial smart timelapse video stream 302 for the event video frames 234a-234c than the original captured video stream 282 for the GOP 290e, but still provide some additional video frames to enable a user to review the CV event 294 compared to the selected non-CV event video frames 234a-234f. For example, the effective framerate of the partial smart timelapse video stream 302 may appear slower for the event video frames 232a-232n compared to the selected non-event video frames 234a-234d, but may also appear faster compared to the event video frames 232a-232n of the full smart timelapse video stream 284 shown in association with FIG. 5.

After the event 294 has ended, the frame rate for video selection may be re-adjusted back to the default (e.g., higher) rate. For example, one video frame may be selected for each of the next two non-event N duration groups of video frames 290f-290g. In the example shown, the video frame 230fa from the GOP 290f may be the selected non-event video frame 234e and the video frame 230ga from the GOP 290g may be the selected non-event video frame 234f. The selected non-event video frames 234e-234f may be selected in chronological order. For example, the selected non-event video frame 234f may be captured at a later time than the event video frames 232a-232c. Selecting less than all of the video frames from the non-event GOPs 290f-290g may result in a higher frame rate for the partial smart timelapse video stream 302 for the selected non-event video frames 234a-234n than the original captured video stream 282 for the GOPs 290f-290g. For example, the effective framerate of the partial smart timelapse video stream 302 may appear faster for the selected non-event video frames 234e-234f compared to the event video frames 232a-232c.

In the example shown, the first video frames 230aa-230ga are shown selected from the respective non-event GOPs 290a-290d and 290f-290g for the selected non-event video frames 234a-234f of the partial smart timelapse video stream 302. The playback speed for the selected non-event video frames 234a-234f may be the same or similar for the partial smart timelapse video stream 302 as the full smart timelapse video stream 284. While the first video frame is shown selected from the non-CV event groups of video frames, any one of the video frames from each of the non-CV event groups 290a-290d and 290f-290g may be selected according to the design criteria of a particular implementation (e.g., each second video frame may be selected).

The partial smart timelapse video 302 may be the encoded video stream ENC_VIDEO presented to the cloud service 202. The partial smart timelapse video stream 302 may be played back by one of the remote devices 204a-204n. The partial smart timelapse video stream 302 may be played back at a normal frame rate.

Since there are fewer selected non-event video frames 234a-234d and 234e-234f to playback from the non-CV portion of the encoded video frames (e.g., compared to the total number of frames in each of the non-CV GOPs 290a-290d and 290f-290g), the playback of the non-CV portion (e.g., the selected non-event video frames 234a-234d and 234e-234f) of the partial smart timelapse video stream 302 may appear to playback at a higher speed than real-time (e.g., similar to the full smart timelapse video stream 284). For example, if there have been 60 non-CV event groups of video frames detected, one video frame may be selected from each for the partial smart timelapse video 302. Playback of the partial smart timelapse video 302 at 60 fps may result in the non-CV event groups being played back in a condensed form of one second (e.g., a higher effective framerate).

Since a subset of the video frames for the CV event 294 have been selected (e.g., every other one of the video frames 230ea-230em from the GOP 290e), the playback of the portion of the partial smart timelapse video stream 302 for the event video frames 232a-232f may be played back at a higher than normal speed (e.g., in faster than real-time, but still less than the playback speed of the non-CV event groups). In the example shown, the frame rate for selection for the partial smart timelapse video stream 302 may be half of the video capture frame rate. Since the non-CV event video frames in the partial smart timelapse video stream 302 may represent a condensed version of the original captured video stream 282, the partial smart timelapse video stream 302 may provide a video stream comprising generally the same content (e.g., in terms of objects and/or events of interest) that may be reviewed by a person faster (e.g., using fewer man-hours). The partial smart timelapse video stream 302 may further condense the content of the CV event video frames. The partial smart timelapse video stream 302 may provide a balanced tradeoff between showing the video frames from the CV event (e.g., fewer event video frames may be available) while enabling a person to review the CV event faster than the full smart timelapse video stream 284.

For the full smart timelapse video stream 284 shown in association with FIG. 5 and the partial smart timelapse video stream 302 shown in association with FIG. 6, the video frames selected by the processor 102 to be encoded for the smart timelapse video are shown as larger than the video frames that may not be selected. The size of the selected video frames and/or the unselected video frames are shown as different for illustrative purposes (e.g., the larger size indicates that the video frame has been selected and the smaller size indicates that the video frames have not been selected). Generally, the selected video frames may not necessarily be a particular type of video frames (e.g., the selected video frames may be any of an I-frame, a B-frame, a P-frame, etc.).

For example, all the video frames in the "CV event duration" GOP 290e may be part of the same encode GOP as the video frames in the "NO CV event duration" GOPs 290a-290d and 290f-290g, which may enable the selected video frames to be any type of video frame. In an example, the selected frames (e.g., the selected non-event video frames 234a-234n and the event video frames 232a-232n) may not need to all be I-frames, because while the video frames 230a-230n are captured and the processor 102 is performing encoding, the object/event detection by the CNN module 190b may be performed in parallel (e.g., the computer vision operations by the CNN module 190b may not have to be finished as soon as the new video frame is captured). The computer vision operations may be performed and then, if an event is detected, the entire video GOP may be marked as an event (e.g., Event A) without changing the video GOP for the event. The processor 102 may decode the whole GOP and select some of the video frames using the CNN module 190b. For example, for the partial smart timelapse video stream 302, the CNN module 190b may decide to just find some of the video frames in the GOP (e.g., for better quality).

Figure 7:
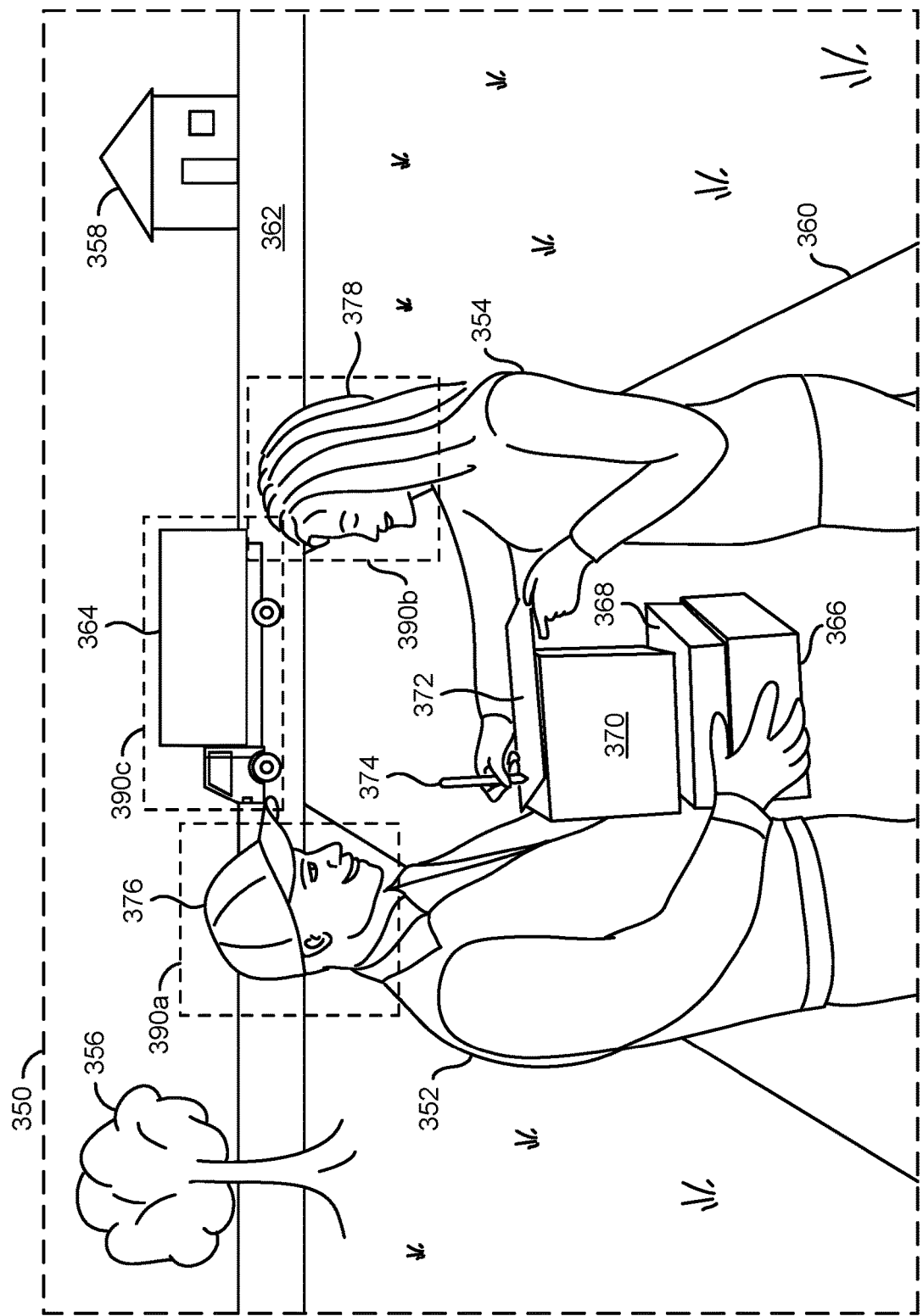
FIG. 7 is a diagram illustrating event detection in a captured video frame.

Referring to FIG. 7, a diagram illustrating event detection in a captured video frame is shown. An example video frame 350 is shown. The example video frame 350 may be an illustrative example of the video data and/or pixel data in the video frames 230a-230n. The example video frame 350 may comprise pixel data provided to the CNN module 190b. The CNN module 190b may be configured to analyze the pixel data of the video frames 230a-230n to determine whether the event/object of interest is present. The types of objects/events detected by the CNN module 190b may be selected by the user and/or defined by the feature set 220 loaded by the processor 102.

The example video frame 350 may be a video captured of a front of the home 50 (e.g., a view from the perspective of the front door directed down the driveway). The example video frame 350 may comprise a delivery person 352 and a person 354 signing for a package delivered by the delivery person 354. The example video frame 350 may further comprise a tree 356, a house 358, a driveway 360, a road 362, a delivery truck 364, a package 366, a package 368, a package 370, a document 372, a pen 374, a head/face 376 and/or a head/face 378. The delivery truck 364 may be parked on the road 362. The person 354 may be accepting delivery of the package 370 by signing the document 372.

Dotted shapes 390a-390c are shown. The dotted shapes 390a-390c may represent the detection of an object by the computer vision operations performed by the processor 102. The dotted shapes 390a-390c may comprise the pixel data corresponding to an object detected by the computer vision operations pipeline and/or the CNN module 190b. The dotted shapes 390a-390c are shown for illustrative purposes. In an example, the dotted shapes 390a-390c may be visual representations of the object detection (e.g., the dotted shapes 390a-390c may not appear on an output video frame sent to the remote devices 204a-204n). In another example, the dotted shapes 390a-390c may be a bounding box generated by the processor 102 displayed on the output video frames to indicate that an object has been detected (e.g., the bounding boxes 390a-390c may be displayed in a debug mode of operation).

The computer vision operations may be configured to detect characteristics of the detected objects and/or behavior of the objects detected. The characteristics of the objects may comprise a height, length, width, slope, an arc length, a color, an amount of light emitted, detected text on the object, a path of movement, a speed of movement, a direction of movement, etc. The characteristics of the detected object may comprise a status of the object (e.g., opened, closed, on, off, etc.). The behavior may be determined in response to the type of object and/or the characteristics of the objects detected. While one example video frame 350 is shown, the behavior of an object may be determined by analyzing a sequence of video frames captured over time. For example, a path of movement and/or speed of movement characteristic may be used to determine that an object classified as a person may be walking or running. The types of characteristics and/or behaviors detected may be varied according to the design criteria of a particular implementation.

In the example shown, the bounding box 390a may be the face/head 376 of the delivery person 352, the bounding box 390b may be the face/head 378 of the person 354 (e.g., the homeowner) and the bounding box 390c may be the delivery truck 364. In an example, the settings (e.g., the feature set) for the processor 102 may define objects of interest to be people and vehicles. For example, the tree 356 and the home 358 may not be objects of interest (e.g., detecting generally static objects may result in continually detecting events). In another example, detecting the homeowner 354 may not be sufficient to be an event, but detecting a particular action/ behavior by the homeowner 354 may be considered an event (e.g., the behavior of the person 354 signing the document 372 for the package 370 may be considered a CV event detection). In yet another example, facial recognition and/or person identification may be used to determine an event. For example, the face 378 of the homeowner 354 may be a known person and not considered an event, but the face 376 of the delivery person 352 may be unknown and the unknown face may be considered a CV event.

Other types of CV events may be detected. In an example, an amount of movement may be a CV event. For example, slight movement of the tree 356 may not be a CV event, but the user may want to view video when the weather is very windy and significant movement of the tree 356 may be defined as an event. In another example, the delivery truck 364 on the road 362 may not be considered an event (e.g., to avoid notifications each time a car drives by), but when the delivery truck 364 is on the driveway 360, the CV event may be detected. The types of objects, movements, events that may be considered CV events may be varied according to the design criteria of a particular implementation.

The example video frame 350 may be tagged in response to the CNN module 190b detecting objects and/or events. For example, the detection of the person 354, the detection of the person 352 and/or the detection of the delivery truck 364 may each generate a metadata tag (e.g., corresponding to one or more of the bounding boxes 390a-390c). Other data, such as a timestamp and/or locations of the bounding boxes 390a-390c may be part of the metadata tagged for the video frame 350. The metadata may comprise multiple tags (e.g., one metadata tag for detecting the homeowner 354, another metadata tag for detecting the delivery person 352, another metadata tag for the behavior of signing the document 372, another metadata tag for detecting the packages 366-370, etc.). The number of metadata tags and/or the type of data stored with the metadata may be varied according to the design criteria of a particular implementation.

Since the example video frame 350 comprises at least one object of interest, the CNN module 190b may tag the video frame 350 as an 'event' video frame. If the smart timelapse video comprises all the video frames for the duration of the event, then the example video frame 350 (and one or more subsequent video frames) may be encoded and transcoded into the smart timelapse video stream. The metadata of the video frame 350 may comprise a timestamp to enable the example video frame 350 to be inserted into the smart timelapse video stream in chronological order.

In some embodiments, the example video frame 350 may be a part of multiple events. In one example, the homeowner 354 may already be a detected object before the delivery person 352 arrives. For example, Event A may be the detection of the homeowner 354 (e.g., the homeowner may be doing yardwork). Then when the delivery person 352 is detected, another event (e.g., Event B) may begin. For example, the video frames detecting the delivery person 352 may be part of Event A and the Event B. When the delivery person 352 leaves, the Event B may end and Event A may continue while the homeowner 354 remains detected. The Event A may end when the homeowner 354 is no longer detected. In some embodiments the video frames corresponding to the Event A may be encoded into one smart timelapse video stream and the video frames corresponding to the Event B may be encoded into a separate smart timelapse video stream (e.g., a user may receive a notification for each event and may be able to view the smart timelapse video stream of the separate events in different videos). In some embodiments, the Event A and the Event B may be encoded into one smart timelapse video stream (e.g., the adjusted rate of selection for the event frames may occur twice at two distinct times when the Event A occurs and again when the Event B occurs and the selection may change back to the non-CV event selection rate in before Event A, after Event B and in between Event A and Event B).

Figure 8:
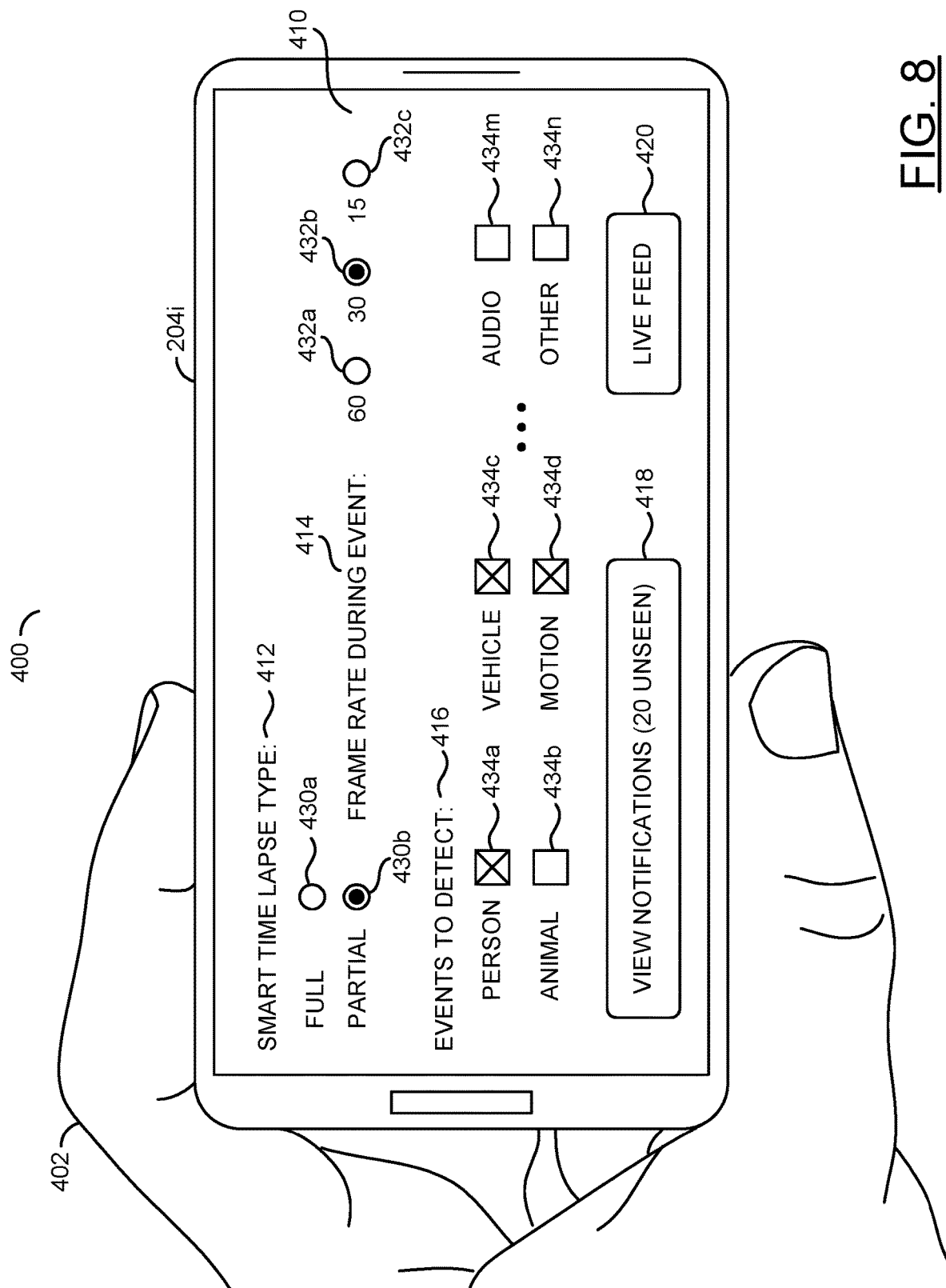
FIG. 8 is a diagram illustrating an application operating on a smart phone for controlling preferences for a timelapse video.

Referring to FIG. 8, a diagram illustrating an application operating on a smart phone for controlling preferences for a timelapse video is shown. An example scenario 400 is shown. In the example scenario 400, a user 402 is shown holding the remote device 204i. In the example shown, the remote device 204i may be a smartphone (e.g., a device comprising a touchscreen display, a processor and/or a wireless communication device).

An interface for an app 410 is shown. For example, the app 410 may be displayed on the touchscreen display of the smartphone 204i. The app 410 may be a companion app for the edge AI device 100. In one example, the app 410 may be configured to enable the smartphone 204i to connect directly to the edge AI device 100. In another example, the app 410 may be configured to enable the smartphone 204i to connect to the event settings 210 and/or the mass video storage 212 of the cloud service 202 to enable the user 402 to control the edge AI device 100. The edge AI device 100 may be configured to operate according to the event settings 210 retrieved from the cloud service 202.

The app 410 may comprise a smart timelapse type setting 412. The smart timelapse type setting 412 may comprise options 430a-430b. In the example shown, the option 430a may comprise the full option 430a and the option 430b may comprise the partial option 430b.

The app 410 may enable the user 402 to select whether the full smart timelapse video stream 284 is encoded by choosing the full option 430a (e.g., all the video frames with a detected event/object are selected) or the partial smart timelapse video stream 302 is encoded. If the partial smart timelapse video stream option 430b is selected, the app 410 may provide an event framerate setting 414. The event framerate setting 414 may comprise options 432a-432c. In the example shown, the option 432a may comprise 60 frames per second, the option 432b may comprise 30 frames per second and the option 432c may comprise 15 frames per second. The user 402 may define the framerate for the selection of video frames 230-230n with the event detected. The available options for frame rate 432a-432c of the partial smart timelapse video stream 302 may be varied according to the design criteria of a particular implementation. Selecting a lower frame rate may result on a more condensed version of the event detected being inserted into the partial smart timelapse video stream 302 (e.g., faster playback speed).

The app 410 may comprise event detection settings 416. The event detection settings 416 may comprise event options 434a-434n. In the example shown, the event option 434a may comprise a person, the event option 434b may comprise an animal, the event option 434c may comprise a vehicle, the event option 434d may comprise motion and the event option 434m may comprise audio. Other event options 434a-434n may be implemented. The event options 434a-434n may enable the user 402 to select the various types of CV events (e.g., objects, events, behaviors, characteristics, etc.) to be detected for the selecting the video frames for the smart timelapse video streams. Generic event options 434a-434n are shown. In one example, specific people (e.g., determined using facial recognition) and/or specific types of animals may be selected (e.g., detect dogs but not squirrels). Generally, the CV events may be detected using the computer vision operations implemented by the processor 102. In some embodiments, the event for determining how and/or when to select the video frames for the smart timelapse video stream may further comprise an audio event (e.g., detecting a sound that may be louder than a pre-defined sound level, particular types of sound signatures, etc.). The audio events may be determined by the processor 102 in response to the signal DIR_AUD captured from the microphones 154a-154n. In some embodiments, the event may determined in response and/or partially in response to sensor data captured by the sensors 152. The types of events available for detection may be varied according to the design criteria of a particular implementation.

In the example shown, the user 402 may have selected the event options 434a (e.g., people), 434c (e.g., vehicles) and 434d (e.g., motion). The event options 434a, 434c and 434d may be uploaded to the cloud service 202 and stored as part of the event settings 210. The cloud service 202 may generate the feature set 220 in response to the event options 434a-434n selected by the user 402 using the app 410. The feature set 220 may be downloaded by the camera system 100. The feature set 220 may be loaded as part of the AI model 250 used by the CNN module 190b when analyzing the video frames 230a-230n.

A button 418 and a button 420 are shown. The button 418 may provide a list of notifications for the user 402. The button 420 may provide a live feed to the user 402. The live feed button 420 may enable the app 410 to provide a view of a live stream (e.g., display the video data currently captured by the edge AI device 100).

The notifications 418 may provide notifications when the CNN module 190b detects an event. For example, the app 410 may enable the user 402 to access the smart timelapse video streams stored on the cloud storage service 202. In response to the user pressing the notification button 418, the cloud service 202 may retrieve one or more of the smart timelapse videos from the mass video storage 212 and communicate the smart timelapse video streams to the smartphone 204i (e.g., via the signal STREAM). The app 410 may be configured to store a timestamp that corresponds with the last viewed one of the smart timelapse video streams communicated using the signal STREAM. The timestamp may be compared to the timestamps of the smart timelapse video streams stored in the mass video storage 212 that are registered to the user 402. The app 410 may present the smart timelapse video streams stored in the mass video storage 212 to the user 402 since the last time that the user 402 viewed one of the smart timelapse video streams.

The timestamps may be used to determine which of the stored smart timelapse video streams the user 402 has already downloaded (or viewed). The timestamps may be used by the app 410 to indicate when a newer (e.g., unviewed) video has become available. In the example shown, the view notifications button 418 indicates that there may be 20 unseen smart timelapse video streams available (e.g., the user 402 has not seen the 20 events detected by the camera system 100). When the user 402 presses the button 418, a list comprising the 20 unseen events may be provided to enable the user to select which events to view. The list may further comprise already viewed smart timelapse video streams.

Figure 9:
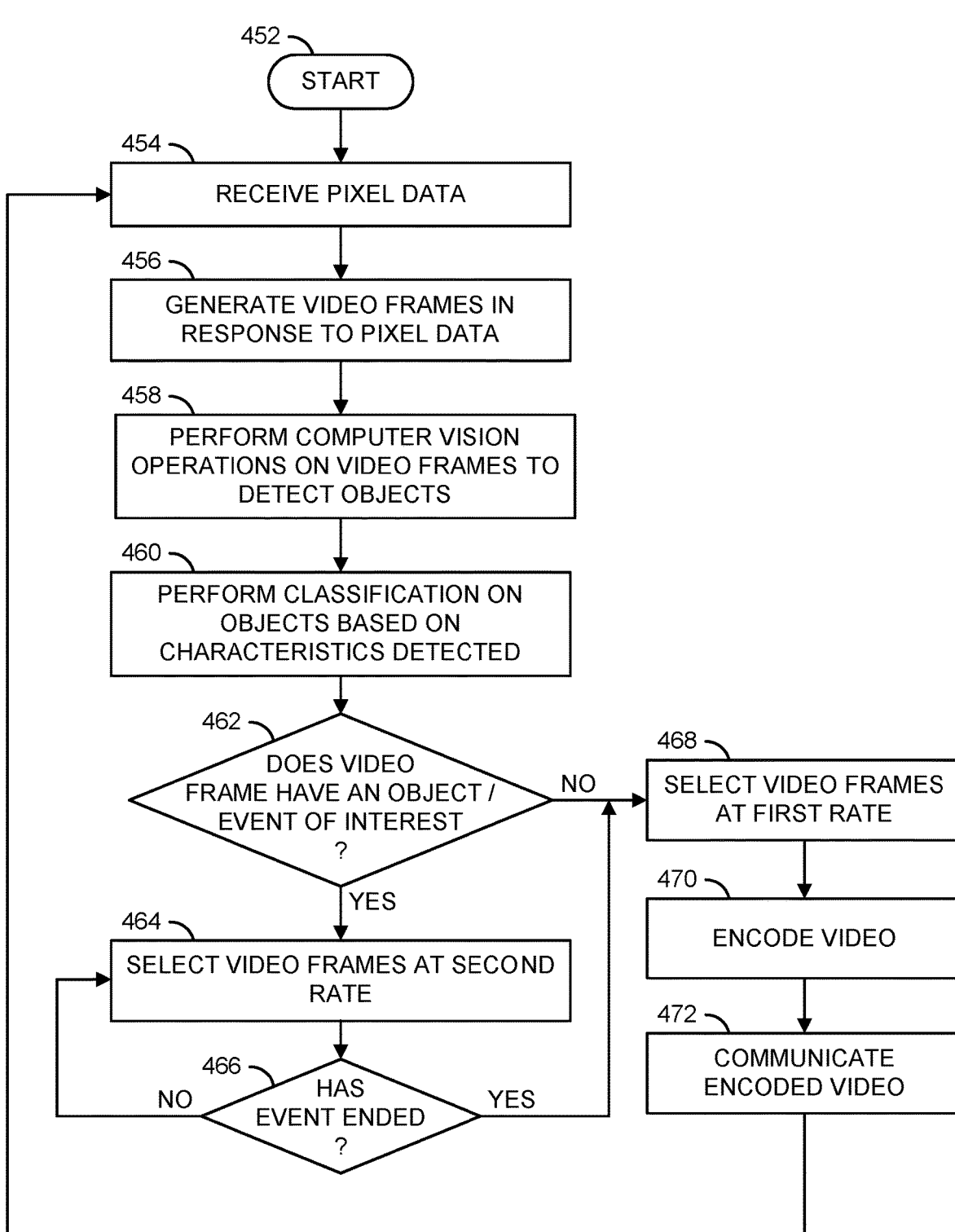
FIG. 9 is a flow diagram illustrating a method for implementing an event/object-of-interest centric timelapse video generation on a camera device with the assistance of neural network input.

Referring to FIG. 9, a method (or process) 450 is shown. The method 450 may implement an event/object-of-interest centric timelapse video generation on a camera device with the assistance of neural network input. The method 450 generally comprises a step (or state) 452, a step (or state) 454, a step (or state) 456, a step (or state) 458, a step (or state) 460, a decision step (or state) 462, a step (or state) 464, a decision step (or state) 466, a step (or state) 468, a step (or state) 470, and a step (or state) 472.

The step 452 may start the method 450. In the step 454, the processor 102 may receive pixel data. In an example, the capture devices 104a-104n may generate the signals PIXELD_A-PIXELD_N and present the signals PIXELD_A-PIXELD_N to the interface 170a-170n for the processor 102. Next, in the step 456, processor 102 may generate the video frames 230a-230n in response to the pixel data PIXELD_A-PIXELD_N. For example, the video processing pipeline of the processor 102 may be configured to perform video processing operations on the pixel data PIXELD_A-PIXELD_N to generate the video frames 230a-230n. Next, the method 450 may move to the step 458.

In the step 458, the CNN module 190b may be configured to perform the computer vision operations on the video frames 230a-230n to detect object (or events). For example, the objects and/or events detected may be determined by the feature set used by the AI model 250. Next, in the step 460, the CNN module 190b may perform a classification of the objects 390a-390c detected based on characteristics detected about the objects. The characteristics detected may be determined by the feature set used by the AI model 250. Next, the method 450 may move to the decision step 462.

In the decision step 462, the processor 102 may determine whether the video frames (e.g., the video frame 350) has an object and/or event of interest. If the video frame does have an object and/or event of interest, then the method 450 may move to the step 464. In the step 464, the processor 102 may select video frames at a second rate. In an example, the second rate may be a full frame rate of the captured video frames 230a-230n. In another example, the second rate may be half the frame rate of the captured video frames 230a-230n. Next, the method 450 may move to the decision step 466.

In the decision step 466, the CNN module 190b may determine whether the detect event has ended. For example, the CNN module 190b may analyze (e.g., perform the computer vision operations on) a sequence of the video frames 230a-230n to determine whether the video frames comprise an event. If the event has not ended, then the method 450 may return to the step 464. For example, video frames that comprise the event may continue to be selected at the second rate. The video frames 230a-230n that are selected at the second rate may be the selected event video frames 232a-232m. The selected event video frames 232a-232m may be presented to the video encoding pipeline 238. In the decision step 466, if the event has ended, then the method 450 may move to the step 468.

In the decision step 462, if the video frame does not have an object and/or event of interest, then the method 450 may move to the step 468. In the step 468, the processor 102 may select video frames at a first rate. The second rate may be greater than the first rate. In an example, at the first rate, one of the video frames 230a-230n may be selected every second. The selected non-event video frames 234a-234n selected at the first rate (e.g., one frame every duration of N) may be presented to the video encoding pipeline 238. Next, in the step 470, the video encoding pipeline 238 may encode the selected event video frames 232a-232m and the selected non-event video frames 234a-234n. The selected event video frames 232a-232m and the selected non-event video frames 234a-234n may be encoded into the encoded video frames 240a-240n based on the timestamps in the metadata tags 252a-252m. In the step 472, the encoded video frames 240a-240n may be communicated by the communication device 156. In one example, the encoded video frames 240a-240n may be the full smart timelapse video stream 284. In another example, the encoded video frames 240a-240n may be the partial smart timelapse video stream 302. Next, the method 450 may return to the step 454.

Figure 10:
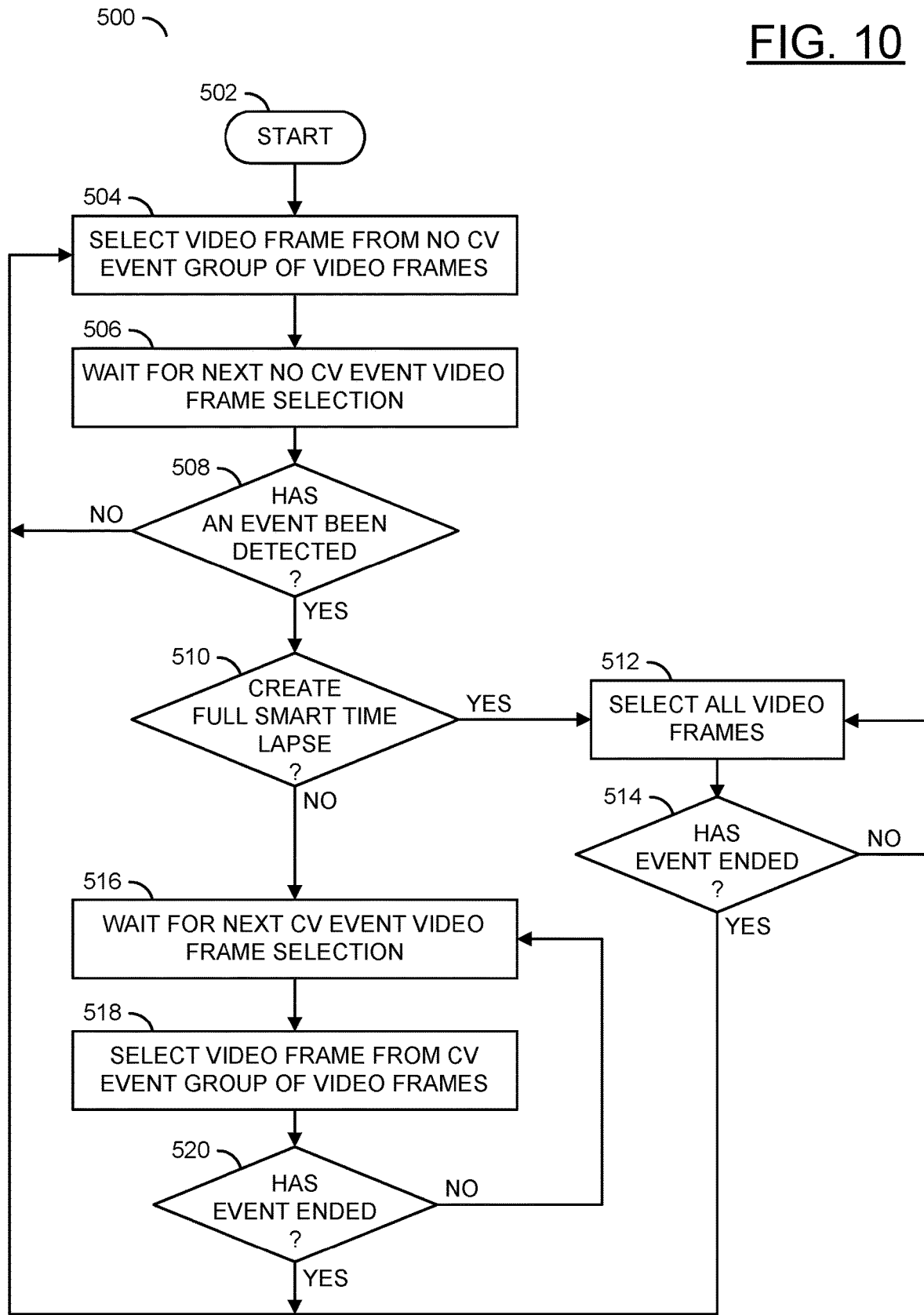
FIG. 10 is a flow diagram illustrating a method for selecting a video frames in response to a determination of whether an event has been detected.

Referring to FIG. 10, a method (or process) 500 is shown. The method 500 may select a video frames in response to a determination of whether an event has been detected. The method 500 generally comprises a step (or state) 502, a step (or state) 504, a step (or state) 506, a decision step (or state) 508, a decision step (or state) 510, a step (or state) 512, a decision step (or state) 514, a step (or state) 516, a step (or state) 518, and a decision step (or state) 520.

The step 502 may start the method 500. The CNN module 190b may analyze the incoming video frames 230a-230n. In the step 504, the processor 102 may select the selected non-event video frame 234a from the video frames 230aa-230an of the no-CV event group 290a. Next, in the step 506, the processor 102 may wait for the next no CV event video frame selection (e.g., duration of N). For example, the processor 102 may wait until the video frame 230ba is received for selection as the selected non-event video frame 234b. Next, the method 500 may move to the decision step 508.

In the decision step 508, the CNN module 190b may determine whether an event has been detected in the video frames 230a-230n. While the decision step 508 is shown as a sequential step, the CNN module 190b may continually analyze the video frames 230a-230n in parallel with other steps. If no event has been detected, then the method 500 may return to the step 504. For example, the processor 102 may select the selected non-event video frame 234 at the first rate while no event is detected by the CNN module 190b. If an event has been detected, then the method 500 may move to the decision step 510.

In the decision step 510, the processor 102 may determine whether to create a full smart timelapse video stream or a partial smart timelapse video stream. The type of smart timelapse video stream to generate may be determined according to the user settings. For example, the user 402 may select the smart timelapse type 412 using the app 410. If the full smart timelapse video stream 284 is to be created, then the method 500 may move to the step 512.

In the step 512, the processor 102 may select all of the video frames 230ea-230em of the CV event group 290e. For example, the video frames 230ea-230em may be the selected event video frames 232a-232f of the full smart timelapse video stream 284. Next, the method 500 may move to the decision step 514. In the decision step 514, the CNN module 190b may determine whether the event has ended. If the event has not ended, then the method 500 may return to the step 512. For example, the processor 102 may select all the video frames 230a-230n as the selected video frames 232a-232m for the full smart timelapse video stream 284 for the duration of the event detected. Next, the method 500 may return to the step 504.

In the decision step 510, if the processor 102 determines that partial smart timelapse video stream 302 is to be created, then the method 500 may move to the step 516. In the step 516, the processor 102 may wait for the next CV event video frame selection for the CV event group 290e. Next, in the step 518, the processor 102 may select the next one of the selected event video frames 232a-232c for the partial smart timelapse video stream 302. Next, the method 500 may move to the decision step 520. In the decision step 520, the CNN module 190b may determine whether the event has ended. If the event has not ended, then the method 500 may return to the step 516. For example, the processor 102 may select less than all of the video frames 230ea-230em of the CV event group 290e, but more video frames than during the non-CV event group 290a. For example, selecting the selected event video frames 232a-232c may be similar to selecting selected non-event video frames 234a-234f, but the selected event video frames 232a-232c may be selected at a higher rate. In an example, the selected event video frames 232a-232c for the partial smart timelapse video 302 may be selected after each duration J. The duration J may be less amount of time than the duration N for selecting the selected non-CV event video frames 234a-234f. If the event has ended, then the method 500 may return to the step 504.

Figure 11:
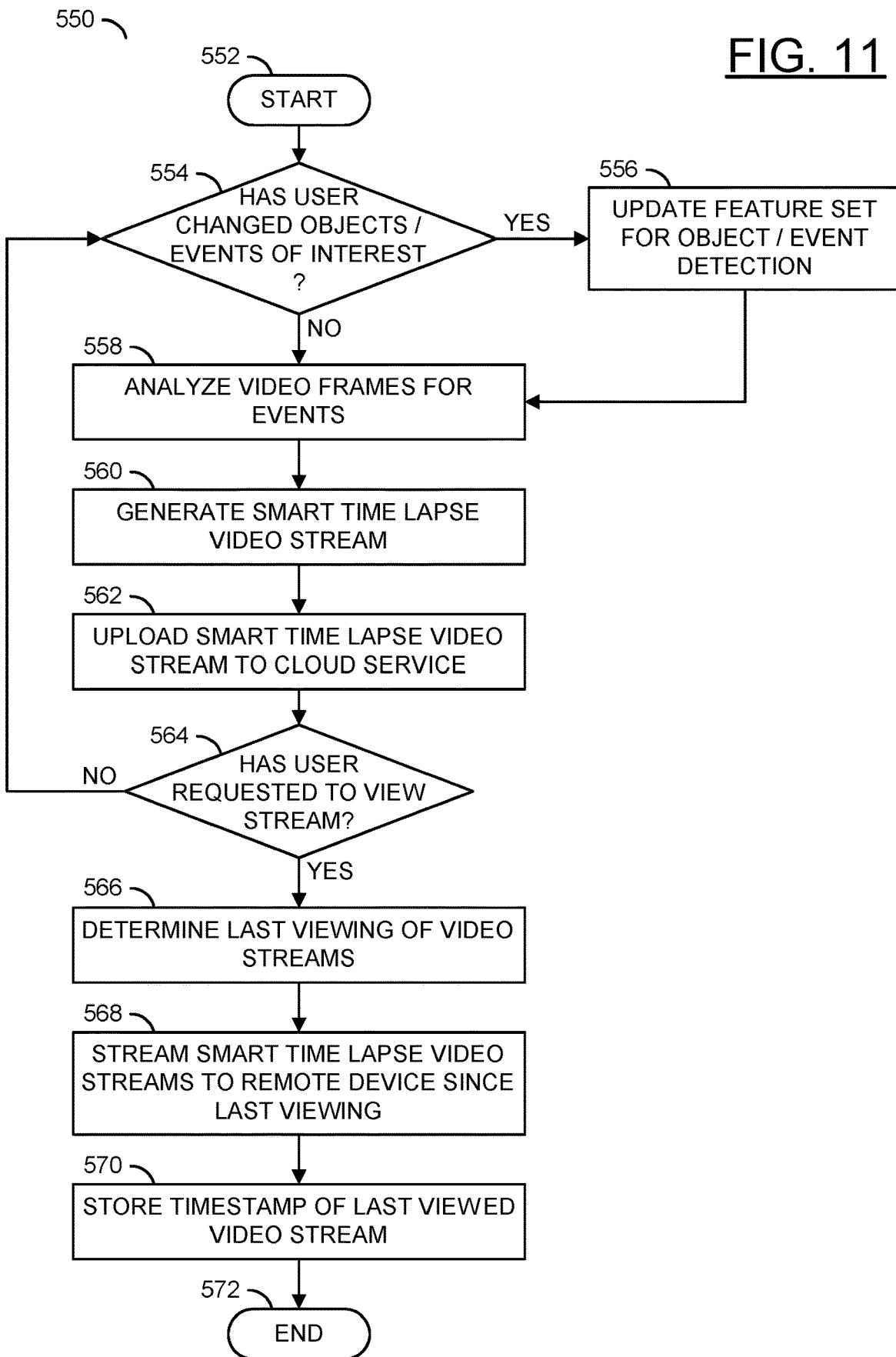
FIG. 11 is a flow diagram illustrating a method for updating a feature set for event detection in response to user input.

Referring to FIG. 11, a method (or process) 550 is shown. The method 550 may update a feature set for event detection in response to user input. The method 550 generally comprises a step (or state) 552, a decision step (or state) 554, a step (or state) 556, a step (or state) 558, a step (or state) 560, a step (or state) 562, a decision step (or state) 564, a step (or state) 566, a step (or state) 568, a step (or state) 570, and a step (or state) 572.

The step 552 may start the method 550. In the decision step 554, the processor 102 may determine whether the user 402 has changed the objects/events of interest. For example, in response to the user 402 providing updates to the event settings 210 using the app 410, the cloud service 202 may communicate the feature set 220. If there is a new feature set 220, then the method 550 may move to the step 556. In the step 556, the processor 102 may update the AI model 250 for the CNN module 190b in response to the feature set 220. Next, the method 550 may move to the step 558. In the decision step 554, if no update to the feature set has been received, then the method 550 may move to the step 558.

In the step 558, CNN module 190b may analyze the video frames 230a-230n for events. Next, in the step 560, the processor 102 may generate the encoded video frames 240a-240n (e.g., the full smart timelapse video stream 284 and/or the partial smart timelapse video stream 302). In the step 562, the communication module 156 may upload the encoded video frames 240a-240n to the cloud service 202. Next, the method 550 may move to the decision step 564.

In the decision step 564, the cloud service 202 may determine whether the user 402 has requested to view one of the smart timelapse video streams (e.g., using the app 410 to access the video stored in the mass video storage 212). If the user 402 has not requested to view one of the smart timelapse video streams, then the method 550 may return to the decision step 554. If the user 402 has requested to view one of the smart timelapse video streams, then the method 550 may move to the step 566.

In the step 566, the processors 214 may determine the time of the last viewing of the video streams (e.g., determine which of the stored smart timelapse video streams have not been viewed previously). Next, in the step 568, the cloud service 202 may stream the smart timelapse video streams since the last viewing (e.g., the signal STREAM) to the remote device (e.g., the smartphones 204a-204n). In the step 570, the cloud service 202 (or the app 410) may store a timestamp of the last viewed video stream. The timestamp may be stored as part of the mass video storage 212. For example, a metadata tag may be added to the smart timelapse videos stored in the mass video storage 212 that indicates whether the video has been previously viewed. Next, the method 550 may move to the step 572. The step 572 may end the method 550.

Figure 12:
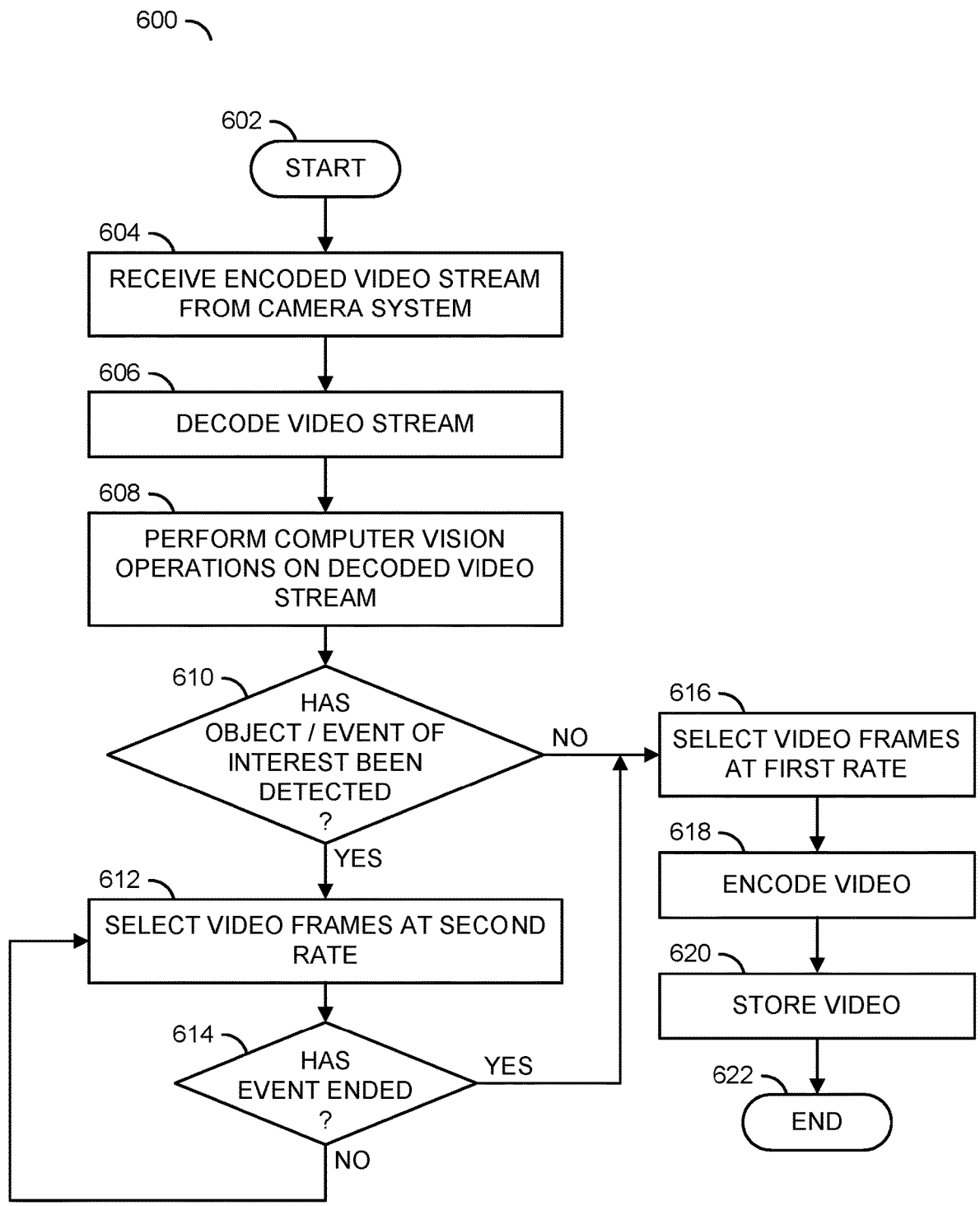
FIG. 12 is a flow diagram illustrating a method for implementing an event/object-of-interest centric timelapse video generation using scalable computing resources.

Referring to FIG. 12, a method (or process) 600 is shown. The method 600 may implement an event/object-of-interest centric timelapse video generation using scalable computing resources. The method 600 generally comprises a step (or state) 602, a step (or state) 604, a step (or state) 606, a step (or state) 608, a decision step (or state) 610, a step (or state) 612, a decision step (or state) 614, a step (or state) 616, a step (or state) 618, a step (or state) 620, and a step (or state) 622.

The step 602 may start the method 600. In the step 604, the processors 214 of the cloud storage service 202 may receive an encoded and/or transcoded video frames/stream (e.g., encoded video frames that are not the smart timelapse video stream). For example, the communication device 156 of the edge device 100 may communicate encoded versions of the video frames 230a-230n to the cloud service 202. Next, in the step 606, the processors 214 may decode the encoded video stream received. In the step 608, the processors 214 may perform the computer vision operations on the decoded video frames. For example, the decoded video frames may be similar to the video frames 230a-230n generated by the processor 102. The processors 214 of the cloud service 202 may comprise a CNN module similar to the CNN module 190b. In some embodiments, the CNN module implemented by the processors 214 may be more powerful than the CNN module 190b implemented on the edge device 100 (e.g., the processors 214 may not be constrained by power consumption requirements of the edge device 100 and/or the cloud service 202 may have access to scalable computing resources that offer more computing resources than the processor 102). In some embodiments, the AI model 250 implemented by the CNN module 190b of the edge device 100 may be a quantized version of the CNN module implemented by the cloud service 202. Next, the method 600 may move to the decision step 610.

In the decision step 610, the processors 214 may determine whether the decoded video frames have an object and/or event of interest. If the video frame does have an object and/or event of interest, then the method 600 may move to the step 612. In the step 612, the processors 214 may select video frames at a second rate. In an example, the second rate may be a full frame rate of the captured video frames 230a-230n. In another example, the second rate may be half the frame rate of the captured video frames 230a-230n. Next, the method 600 may move to the decision step 614.

In the decision step 614, the processors 214 may determine whether the detect event has ended. For example, the processors 214 may analyze (e.g., perform the computer vision operations on) a sequence of the decoded video frames to determine whether the video frames comprise an event. If the event has not ended, then the method 600 may return to the step 612. For example, video frames that comprise the event may continue to be selected at the second rate. The decoded video frames that are selected at the second rate may be the selected event video frames 232a-232m. In the decision step 614, if the event has ended, then the method 600 may move to the step 616.

In the decision step 610, if the decoded video frame does not have an object and/or event of interest, then the method 600 may move to the step 616. In the step 616, the processors 214 may select video frames at a first rate. The second rate may be greater than the first rate. In an example, in the first rate, one of the decoded video frames may be selected every second. The selection of the video frames for a smart timelapse video stream by the processors 214 may be similar to the selection of the video frames for a smart timelapse video stream by the processor 102 on the edge device 100. Next, in the step 618, the processors 214 may encode the selected event video frames 232a-232m and the selected non-event video frames 234a-234n. The selected event video frames 232a-232m and the selected non-event video frames 234a-234n may be encoded into the encoded video frames 240a-240n based on the timestamps in the metadata tags 252a-252m. In the step 620, the encoded video frames 240a-240n may be stored in the mass video storage 212. In one example, the encoded video frames 240a-240n may be the full smart timelapse video stream 284. In another example, the encoded video frames 240a-240n may be the partial smart timelapse video stream 302. Next, the method 600 may move to the step 622. The step 622 may end the method 600.

The functions performed by the diagrams of FIGS. 1-12 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is (are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
    an interface configured to receive pixel data generated by a capture device; and
    a processor configured to (i) receive said pixel data from said interface, (ii) process said pixel data arranged as video frames, (iii) perform computer vision operations on said video frames to generate metadata about characteristics of objects detected, (iv) determine whether said metadata corresponds to a user-defined event and (v) generate encoded video frames from a video stream of said video frames, wherein
        (a) said video frames are tagged with said metadata comprising (i) an event label if said characteristics of said objects corresponds to said user-defined event and (ii) a non-event label if said characteristics of said objects do not correspond to said user-defined event,
        (b) said video stream comprises at least one group of pictures comprising said event label, and
        (c) said encoded video frames are generated by (i) selecting a number of said video frames from each of a plurality of groups of pictures comprising said video frames with said non-event label, and (ii) selecting more than said number of said video frames from said group of pictures comprising said video frames with said event label.

2. The apparatus according to claim 1, wherein (i) said metadata further comprises a timestamp, (ii) each of said plurality of groups of pictures comprising said video frames with said non-event label has a first duration of said video frames and (iii) said video frames selected for said encoded video frames are arranged according to said timestamp.

3. The apparatus according to claim 1, wherein (i) said encoded video frames are communicated to a cloud storage service, (ii) said apparatus and said capture device are implemented on an edge device and (iii) said edge device communicates with said cloud storage service.

4. The apparatus according to claim 1, wherein (i) all of said video frames from said group of pictures comprising said video frames with said event label are selected and (ii) a frame rate of a portion of said encoded video frames that comprise said group of pictures comprising said video frames with said event label is the same as a frame rate of said video stream.

5. The apparatus according to claim 1, wherein said encoded video frames provide a smart timelapse video stream comprising a video display speed that is automatically adjusted by said processor in response to content in said video frames.

6. The apparatus according to claim 1, wherein (i) a user selects said objects that correspond to said user-defined event using a smartphone app and (ii) said user-defined event comprises a classification of said objects using said computer vision operations as at least one a person, a license plate, an animal depending on a selection by said user on said smartphone app.

7. The apparatus according to claim 1, wherein a first sample of said video frames in said encoded video frames comprises a condensed version of said video frames with a high display speed for content in said plurality of groups of pictures comprising said video frames with said non-event label for said user-defined event.

8. The apparatus according to claim 7, wherein (i) a second sample of said video frames in said encoded video frames comprises said video frames with a normal display speed for content in said group of pictures comprising said video frames with said event label and (ii) a third sample of said video frames in said encoded video frames comprises said condensed version of said video frames with said high display speed for content in said plurality of groups of pictures comprising said non-event label.

9. The apparatus according to claim 1, wherein said event label is added to said metadata for said video frames by a convolutional neural network module implemented using a plurality of hardware engines in said processor.

10. The apparatus according to claim 1, wherein (i) said computer vision operations are configured to detect said objects by performing feature extraction based on neural network weight values for each of a plurality of visual features that are associated with said objects extracted from said video frames and (ii) said neural network weight values are determined in response to an analysis of training data by said processor prior to said feature extraction.

11. The apparatus according to claim 1, wherein said processor is further configured to (i) detect a first occurrence of said user-defined event in said video frames and a second occurrence of said user-defined event in said video frames, (ii) generate a first file of said encoded video frames comprising selections from said plurality of groups of pictures comprising said video frames with said non-event label comprising a timestamp before said first occurrence of said user-defined event and selections of said group of pictures comprising said event label corresponding to said first occurrence of said user-defined event and (iii) generate a second file of said encoded video frames comprising selections from said plurality of groups of pictures comprising said video frames with said non-event label comprising said timestamp after said first occurrence of said user-defined event and selections of said group of pictures comprising said event label corresponding to said second occurrence of said user-defined event.

12. A method for generating an encoded video stream, comprising the steps of:
- receiving pixel data generated by a capture device,
- generating video frames in response to said pixel data,
- performing computer vision operations on said video frames to detect objects,
- generating metadata for each of said video frames in response to performing a classification of said objects detected based on characteristics of said objects,
- determining whether said classification of said objects corresponds to a user-defined event; and
- generating encoded video frames from a video stream of said video frames, wherein
  - (a) said encoded video frames are communicated to a cloud storage service,
  - (b) said video frames are tagged with said metadata comprising (i) a label for said user-defined event if said classification of said objects corresponds to said user-defined event and (ii) a timestamp,
  - (c) said video stream comprises a plurality of groups of pictures comprising said video frames without said label for said user-defined event, each having a first duration of said video frames,
  - (d) said video stream comprises at least one group of pictures comprising said video frames with said label for said user-defined event,
  - (e) said encoded video frames are generated by (i) selecting one video frame from each of said plurality of groups of pictures comprising said video frames without said label for said user-defined event, and (ii) selecting more than one of said video frames from said group of pictures comprising said video frames with said label for said user-defined event, and
  - (f) said video frames selected for said encoded video frames are arranged according to said timestamp.

13. The method according to claim 12, wherein (i) all of said video frames from said group of pictures comprising said video frames with said label for said user-defined event are selected and (ii) a frame rate of a portion of said encoded video frames that comprise said group of pictures comprising said video frames with said label for said user-defined event is the same as a frame rate of said video stream.

14. The method according to claim 12, wherein a frame rate of a portion of said encoded video frames that comprise said group of pictures comprising said video frames with said label for said user-defined event is the same as a frame rate of said video stream.

15. The method according to claim 12, wherein said video frames selected comprise any of an I-frame, a B-frame, or a P-frame.

16. The method according to claim 12, further comprising the step of accessing said encoded video frames stored on said cloud storage service using a smartphone app.

17. The method according to claim 16, further comprising the steps of:
- storing a viewed timestamp corresponding to a last time that a user viewed said encoded video frames; and
- presenting said encoded video frames stored by said cloud storage service to said user since said last time that said user viewed said encoded video frames.

18. The method according to claim 12, wherein (i) a user selects said classification of said objects that correspond to said user-defined event using a smartphone app and (ii) said user-defined event comprises said classification of said objects using said computer vision operations as at least one of a person, a license plate, an animal depending on a selection by said user on said smartphone app.

19. The method according to claim 12, wherein a first sample of said video frames in said encoded video frames comprises a condensed version of said video frames with high display speed for content in said plurality of groups of pictures comprising said video frames without said label for said user-defined event.

20. The method according to claim 19, wherein (i) a second sample of said video frames in said encoded video frames comprises said video frames with a normal display speed for content in said group of pictures comprising said video frames with said label for said user-defined event and (ii) a third sample of said video frames in said encoded video frames comprises said condensed version of said video frames with said high display speed for content in said plurality of groups of pictures comprising said video frames without said user-defined event.

\* \* \* \* \*